United States Patent
Choi et al.

(10) Patent No.: US 10,531,380 B2
(45) Date of Patent: Jan. 7, 2020

(54) METHOD AND DEVICE FOR TRANSMITTING/RECEIVING FRAME RELATED TO MULTI-USER TRANSMISSION IN WIRELESS LAN SYSTEM

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,025

(22) PCT Filed: Apr. 11, 2016

(86) PCT No.: PCT/KR2016/003787
§ 371 (c)(1),
(2) Date: Oct. 3, 2017

(87) PCT Pub. No.: WO2016/163849
PCT Pub. Date: Oct. 13, 2016

(65) Prior Publication Data
US 2018/0167882 A1 Jun. 14, 2018

Related U.S. Application Data

(60) Provisional application No. 62/144,943, filed on Apr. 9, 2015, provisional application No. 62/152,048, filed on (Continued)

(51) Int. Cl.
*H04W 52/02* (2009.01)
*H04W 72/04* (2009.01)
(Continued)

(52) U.S. Cl.
CPC ... *H04W 52/0216* (2013.01); *H04W 72/0446* (2013.01); *H04W 72/121* (2013.01);
(Continued)

(58) Field of Classification Search
CPC . H04W 52/02; H04W 52/0216; H04W 72/04; H04W 72/0446; H04W 72/12;
(Continued)

(56) References Cited

U.S. PATENT DOCUMENTS

| | | | |
|---|---|---|---|
| 2013/0329620 A1* | 12/2013 | Kim | H04W 52/0229 370/311 |
| 2015/0085780 A1* | 3/2015 | Kim | H04W 52/0216 370/329 |
| 2016/0143006 A1* | 5/2016 | Ghosh | H04W 74/004 370/329 |

FOREIGN PATENT DOCUMENTS

| | | |
|---|---|---|
| KR | 10-2012-0100127 A | 9/2012 |
| KR | 10-2014-0073542 A | 6/2014 |

(Continued)

*Primary Examiner* — Kan Yuen
(74) *Attorney, Agent, or Firm* — Birch, Stewart, Kolasch & Birch, LLP

(57) ABSTRACT

One embodiment of the present invention is a method for a STA transmitting/receiving a frame in a wireless communication system, the method for transmitting/receiving a frame comprising the steps of: receiving a beacon frame comprising TIM information and trigger frame information; and entering into doze mode, wherein the trigger frame information comprises information indicating the existence or not of resource allocation for random access, and the trigger frame information comprises UL MU frame type information.

6 Claims, 19 Drawing Sheets

Related U.S. Application Data on Apr. 24, 2015, provisional application No. 62/173,963, filed on Jun. 11, 2015, provisional application No. 62/187,268, filed on Jul. 1, 2015, provisional application No. 62/189,226, filed on Jul. 7, 2015.

(51) Int. Cl.

| | | |
|---|---|---|
| *H04W 72/12* | (2009.01) | |
| *H04W 74/00* | (2009.01) | |
| H04W 84/12 | (2009.01) | |
| H04W 74/04 | (2009.01) | |
| H04W 74/02 | (2009.01) | |
| H04W 74/08 | (2009.01) | |

(52) U.S. Cl.
CPC .......... *H04W 74/008* (2013.01); *H04W 74/02* (2013.01); *H04W 74/04* (2013.01); *H04W 74/0833* (2013.01); *H04W 84/12* (2013.01); *Y02D 70/10* (2018.01); *Y02D 70/1224* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/21* (2018.01); *Y02D 70/22* (2018.01)

(58) Field of Classification Search
CPC ... H04W 72/121; H04W 74/00; H04W 74/04; H04W 74/08; H04W 84/12; Y02D 70/10
See application file for complete search history.

(56) References Cited

FOREIGN PATENT DOCUMENTS

| KR | 10-2014-0084171 A | 7/2014 |
|---|---|---|
| KR | 10-2015-0000489 A | 1/2015 |
| WO | WO 2013/077692 A1 | 5/2013 |

\* cited by examiner

FIG. 18

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name : | BW | Reserved | STBC | Group ID | NSTS / Partial AID | | | | TXOP_PS_NOT_ALLOWED | Reserved |
| SU Name : | | | | | SU NSTS | Partial AID | | | | |
| MU Name : | | | | | MU[0] NSTS | MU[1] NSTS | MU[2] NSTS | MU[3] NSTS | | |
| Bits : | 2 | 1 | 1 | 6 | 3 | 3 | 3 | 3 | 1 | 1 |

( a ) VHT-SIG-A1 structure

| | B0 | B1 | B2 | B3 | B4 | B5 | B6 | B7 | B8 | B9 | B10 B27 | B18 B23 |
|---|---|---|---|---|---|---|---|---|---|---|---|---|
| Composite Name : | Short GI | Short GI NSYM Disambiguation | SU/MU[0] Coding | LDPC Extra OFDM Symbol | SU VHT-MCS/MU[1-3] Coding | | | | Beam-formed | Reserved | CRC | Tail |
| SU Name : | | | | | SU VHT-MCS | | | | Beam-formed | | | |
| MU Name : | | | | | MU[1] Coding | MU[2] Coding | MU[3] Coding | Reserved | Reserved | | | |
| Bits : | 1 | 1 | 1 | 1 | 1 | 1 | 1 | 1 | 1 | 1 | 8 | 6 |

( b ) VHT-SIG-A2 structure

FIG. 19
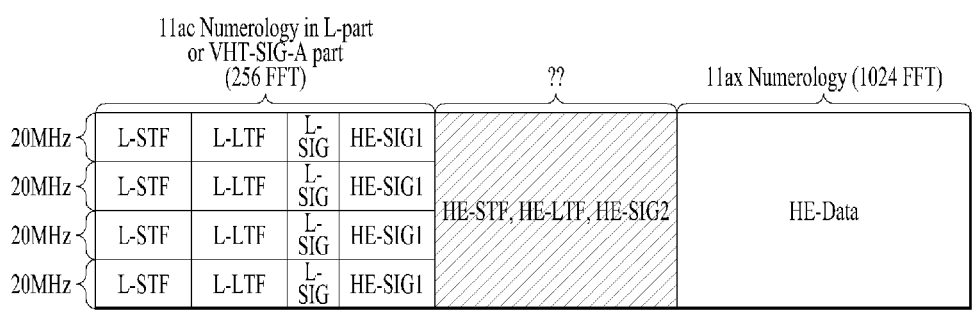
(a) HE PPDU format
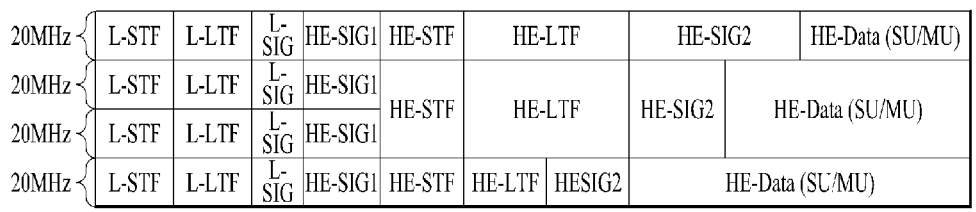
(b) HE PPDU format
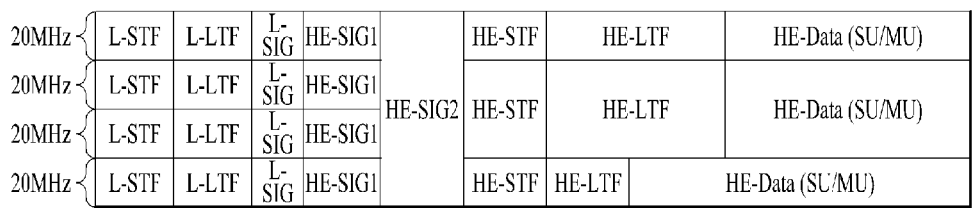
(c) HE PPDU format

METHOD AND DEVICE FOR TRANSMITTING/RECEIVING FRAME RELATED TO MULTI-USER TRANSMISSION IN WIRELESS LAN SYSTEM

CROSS REFERENCE TO RELATED APPLICATIONS:

This application is the National Phase of PCT International Application No. PCT/KR2016/003787, filed on Apr. 11, 2016, which claims priority under 35 U.S.C. 119(e) to U.S. Provisional Application No. 62/144,943, filed on Apr. 9, 2015, No. 62/152,048, filed on Apr. 24, 2015, No. 62/173,963, filed on Jun. 11, 2015, No. 62/187,268, filed on Jul. 1, 2015 and No. 62,189,226, filed on Jul. 7, 2015, all of which are hereby expressly incorporated by reference into the present application.

TECHNICAL FIELD

Following description relates to a wireless communication system, and more particularly, to a method of transmitting/receiving a frame related to MU (Multi User) transmission and an apparatus therefor.

BACKGROUND ART

With recent development of information communication technologies, a variety of wireless communication technologies have been developed. Among such technologies, WLAN allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

Machine-to-machine (M2M) communication technology has been discussed as a next generation communication technology. A technical standard to support M2M communication in the IEEE 802.11 WLAN system is also under development as IEEE 802.11ah. In communication, a scenario in which a small amount of data is occasionally communicated at a low speed in an environment including a large number of devices may be considered.

In a wireless LAN system, communication is performed in a medium shared by all devices. If the number of devices increases in communication such as M2M communication, it is necessary to more efficiently enhance a channel access mechanism to reduce unnecessary power consumption and interference occurrence.

DISCLOSURE OF THE INVENTION

Technical Tasks

A technical task of the present invention is to provide a method of transmitting and receiving trigger frame information and a frame according to the trigger frame information.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a frame, which is transmitted and received by a station (STA) in a wireless communication system, includes the steps of receiving a beacon frame including TIM information and trigger frame information, and entering a doze mode. In this case, the trigger frame information includes information indicating whether or not resource allocation for random access exists and the trigger frame information includes UL MU frame type information.

To further achieve these and other advantages and in accordance with the purpose of the present invention, according to a different embodiment, a station (STA) in a wireless communication system includes a transceiver, and a processor, the processor configured to receive a beacon frame including TIM information and trigger frame information, the processor configured to enter a doze mode. In this case, the trigger frame information includes information indicating whether or not resource allocation for random access exists and the trigger frame information includes UL MU frame type information.

The trigger frame information can include trigger frame type information indicating whether a trigger frame is for scheduling access or is for random access.

If the trigger frame type information corresponds to 1, the trigger frame type information indicates that a trigger frame corresponds to a scheduling access trigger frame. If the trigger frame type information corresponds to 0, the trigger frame type information can indicate that a trigger frame corresponds to a random access trigger frame.

If the STA is configured to use the scheduling access trigger frame, the STA can maintain the doze mode until the trigger frame of which the trigger frame type information corresponds to 1 is transmitted.

If the trigger frame type information corresponds to 1, the trigger frame is received based on information indicated by the trigger frame information and one frame selected from the group consisting of a PS-poll frame, a QoS null frame, and a BSR (buffer status report) frame can be transmitted to MU (multi user).

The trigger frame information can include at least one of a start offset indicates transmission time of the trigger frame, resource allocation information, the number of STAs which receives trigger frame, AID related information of STA which receives trigger frame.

The trigger frame information can include information of UL MU frame type which is triggered by a trigger frame.

The UL MU frame type information can indicate a frame triggered by the trigger frame from among a PS-poll frame, a QoS null frame, a UL MU data transmission frame, a BSR (buffer status report), and CSI feedback.

Advantageous Effects

According to the present invention, it is able to more improve a power saving effect of an STA.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 17 and 18 are diagrams for an example of a VHT PPDU frame format of IEEE 802.11ac system;

FIG. 19 is a diagram for an example of a PPDU format in 11 ax;

BEST MODE

Mode for Invention

Figure 1:
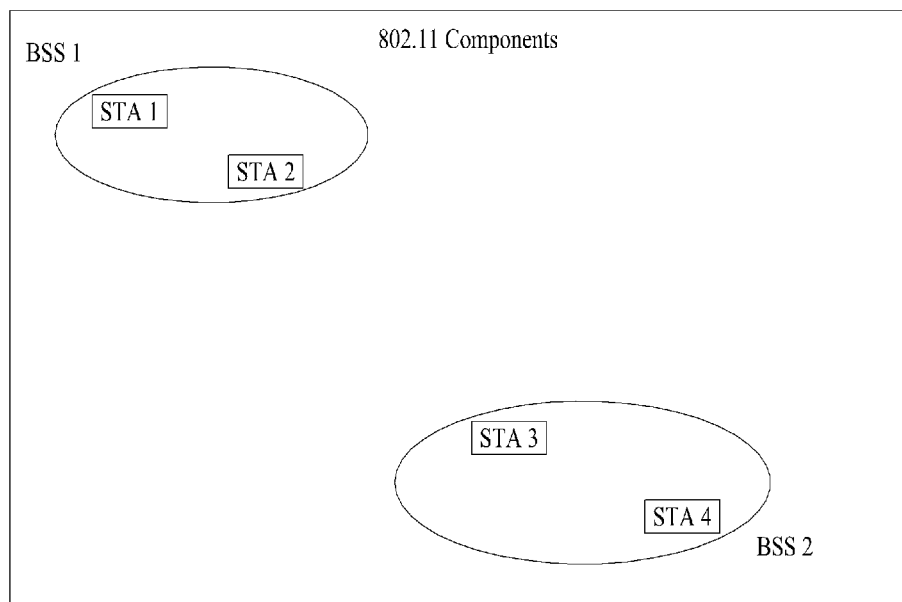
FIG. 1 is a diagram for an example of a structure of IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out.

The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
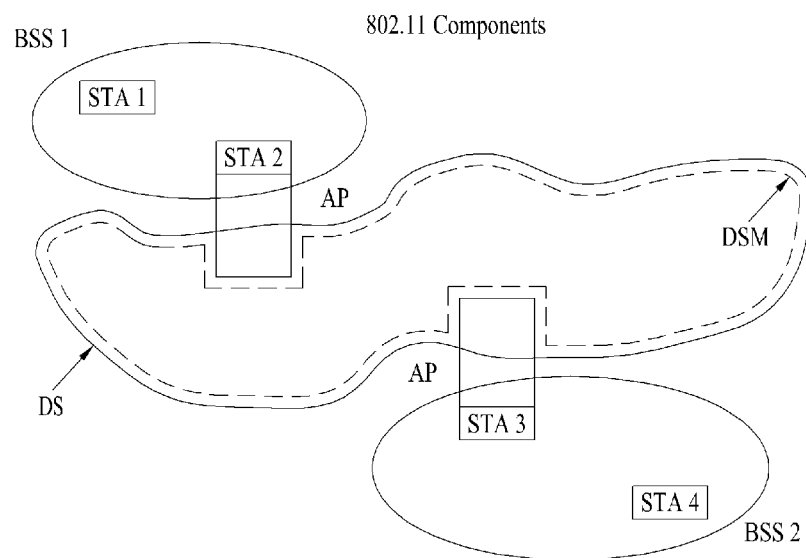
FIG. 2 is a diagram for a different example of a structure of IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
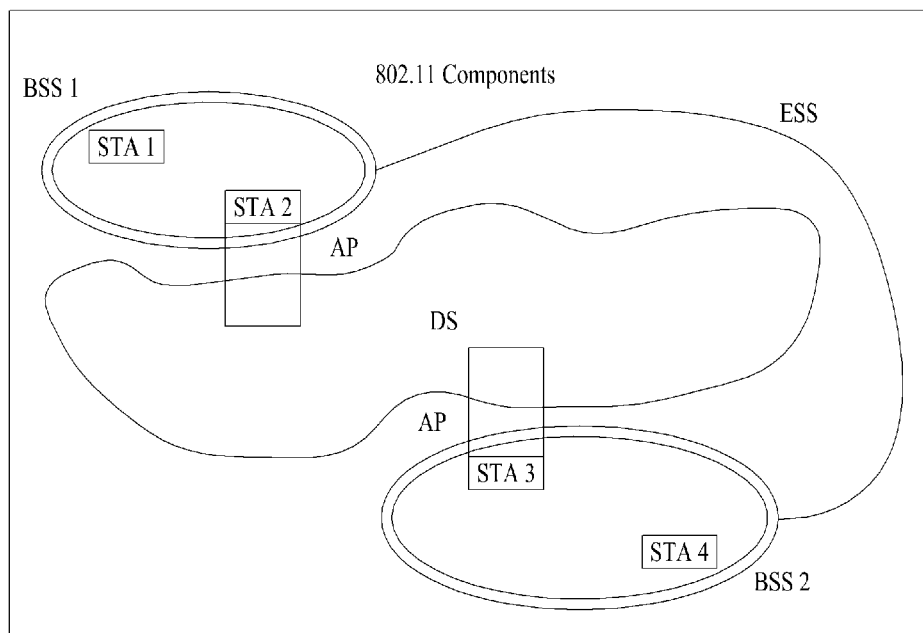
FIG. 3 is a diagram for a further different example of a structure of IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
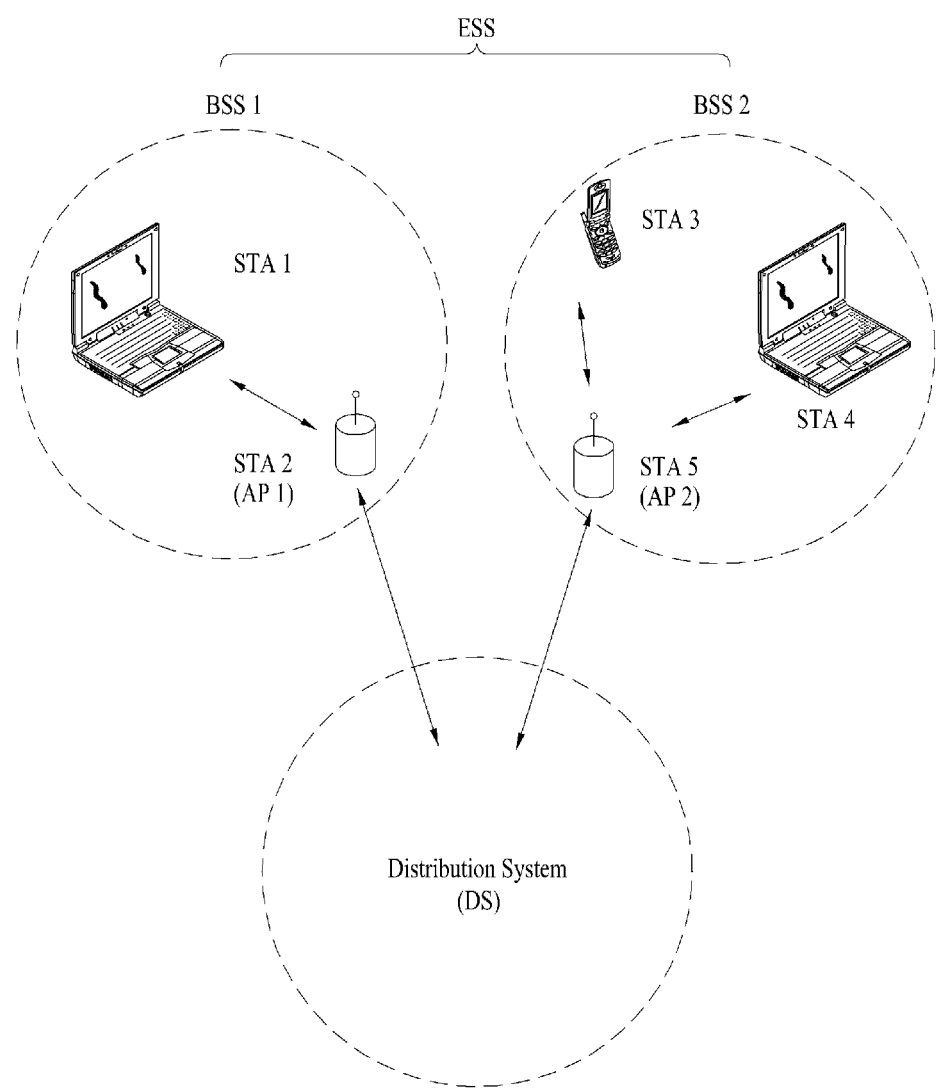
FIG. 4 is a diagram for an example of a structure of a wireless LAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
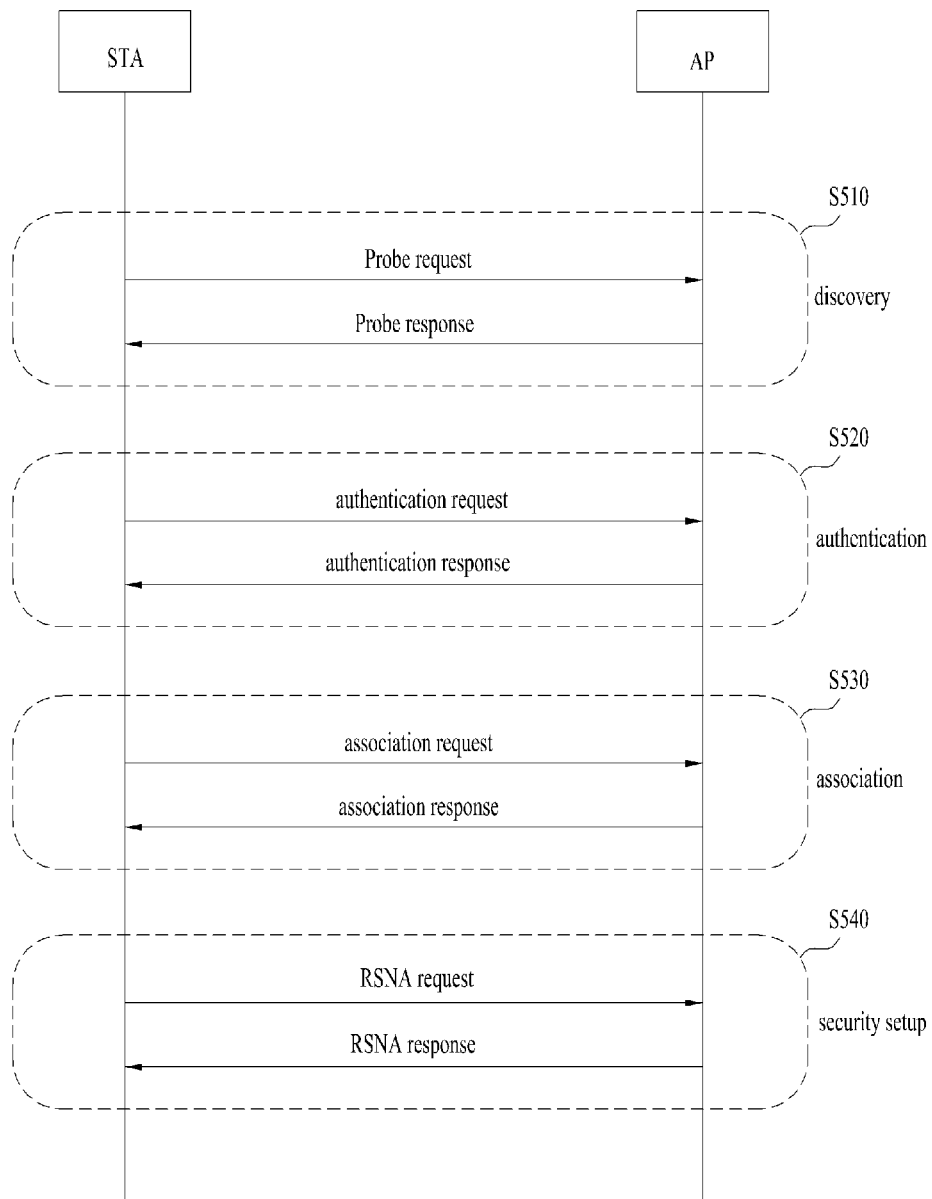
FIG. 5 is a diagram for explaining a link setup procedure in a wireless LAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation process or a session setup process. In addition, discovery, authentication, association, and security setup of the link setup process may also be called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11

WLAN systems which have been recently proposed to support a data processing rate of 1Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11 af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11 ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
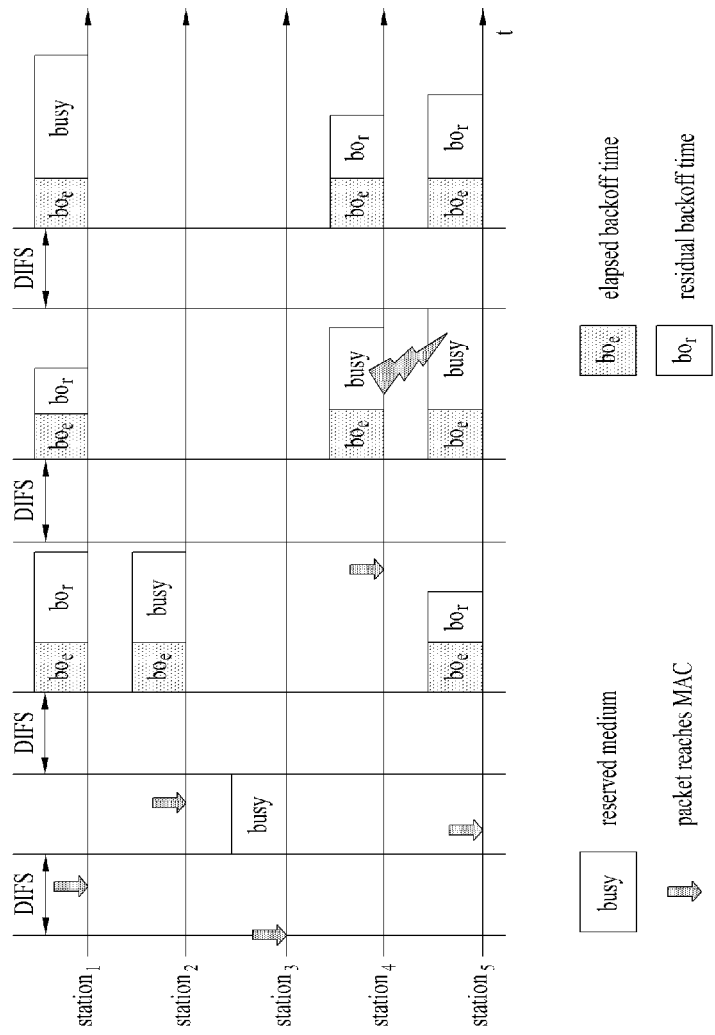
FIG. 6 is a diagram for explaining a backoff procedure.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to $2n-1$ (where $n=0, 1, 2, \ldots$).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
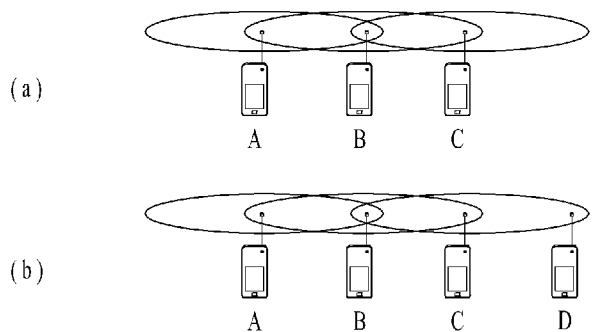
FIG. 7 is a diagram for explaining a hidden node and an exposed node.

FIG. 7 is a diagram for explaining a hidden node and an exposed node.

FIG. 7(*a*) exemplarily shows a hidden node. In FIG. 7(*a*), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(*b*) exemplarily shows an exposed node. In FIG. 7(*b*), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
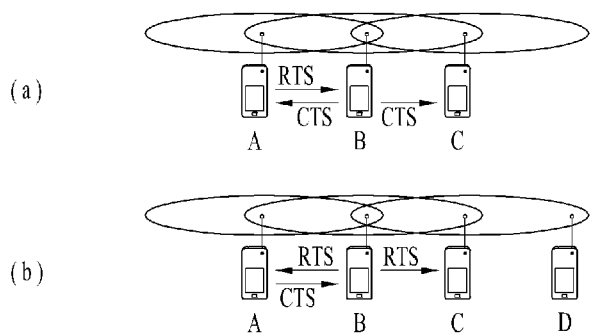
FIG. 8 is a diagram for explaining RTS and CTS.

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
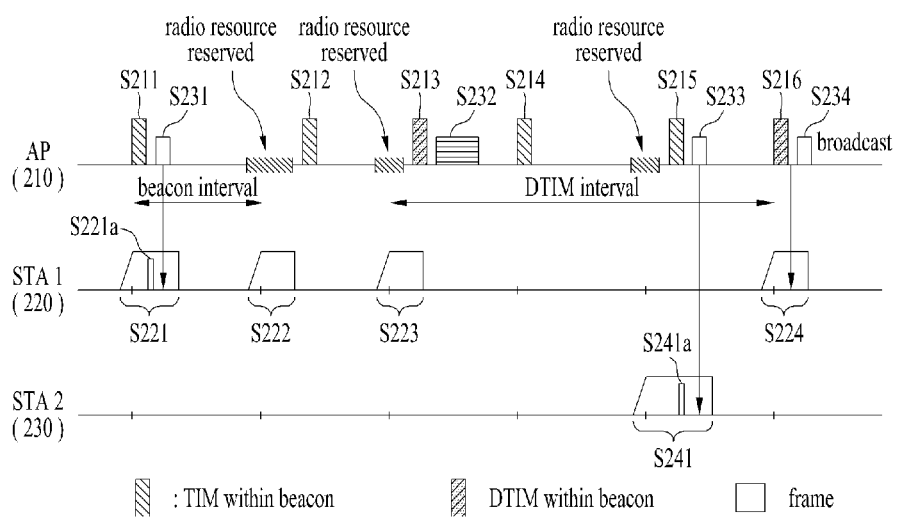
FIG. 9 is a diagram for explaining a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
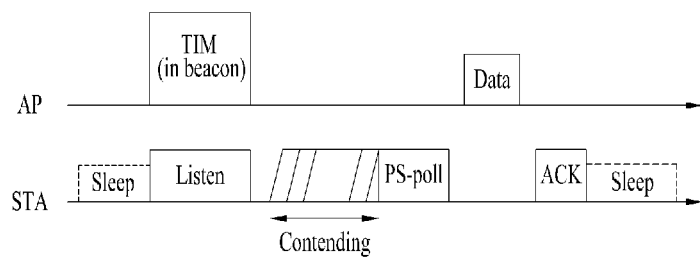
FIGS. 10 to 12 are diagrams for explaining an operation of an STA, which has received TIM, in detail.
Figure 11:
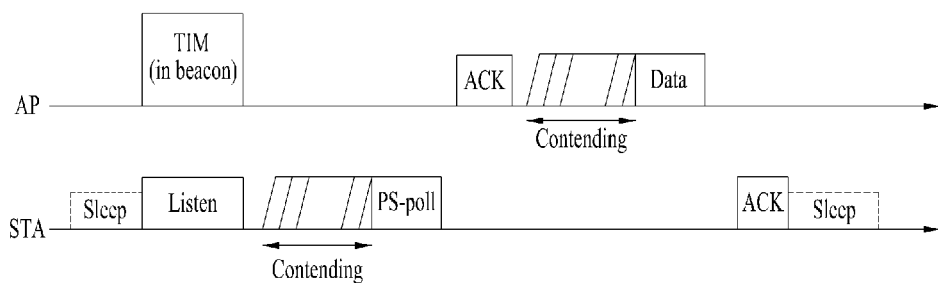
Figure 12:
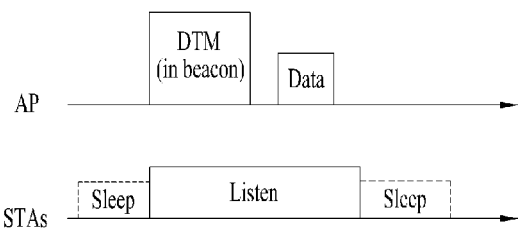

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In case of a method of managing a power saving mode based on the TIM (DTIM) protocol mentioned earlier with reference to FIGS. 9 to 12, STAs can check whether or not there exists a data frame to be transmitted to the STAs via STA identification information included in a TIM element. The STA identification information may correspond to information related to an AID (association identifier) which is an identifier assigned to an STA when the STA is associated with an AP.

The AID is used as a unique identifier for each STA in a single BSS. As an example, the AID is assigned by a value among values ranging from 1 to 2007 in a current wireless LAN system. In a currently defined wireless LAN system, 14 bits can be assigned to a frame transmitted by an AP and/or an STA as the AID. Although a value of the AID can be assigned up to 16383, values ranging from 2008 to 16383 are configured as reserved values.

A TIM element according to a legacy definition is not suitable for being applied to an M2M application that many numbers (e.g., over 2007) of STAs are associated with a single AP. In case of expanding a legacy TIM structure as it is, since a size of a TIM bitmap becomes too large, it is unable to support with a legacy frame format and it is not appropriate for M2M communication considering an application of a low transmission rate. And. It is expected that the number of STAs in which a reception data frame exists during a single beacon interval is very small in M2M communication. Hence, in case of considering the aforementioned M2M communication application example, although a size of a TIM bitmap is enlarged, it is expected a case that most of bits has a value of 0 frequently occurs. Thus, a technology of efficiently compressing a bitmap is required.

As a legacy bitmap compression technology, there is a method of omitting contiguous 0's at the forepart of a bitmap and defining by an offset (or start point) value. Yet, if the number of STAs in which a buffered frame exists is less and a difference of an AID value of each STA is big, a compression efficiency of the method is not high. For example, when a frame, which is to be transmitted to 2 STAs respectively including an AID of 10 and an AID of 2000, is buffered only, although a length of a compressed bitmap corresponds to 1990, all bits have a value of 0 except both ends. If the number of STAs capable of being associated with a single AP is less, inefficiency of bitmap compression is not a big problem. Yet, if the number of STAs increases, the inefficiency may become an element deteriorating overall system performance.

As a method of solving the aforementioned problem, data transmission can be more efficiently performed in a manner of dividing an AID into a plurality of groups. A designated group ID (GID) is assigned to each of a plurality of the groups. The AID assigned based on a group is explained with reference to FIG. 13 in the following.

FIG. 13(a) is a diagram for an example of an AID assigned based on a group. Referring to the example of FIG. 13(a), several bits at the front of an AID bitmap can be used to indicate a GID. For example, first 2 bits of the AID bitmap can be used for indicating 4 GIDs. When the total length of an AID bitmap corresponds to N bits, a value of first 2 bits (B1 and B2) indicates a GID of the AID.

FIG. 13(b) is a diagram for a different example of an AID assigned based on a group. Referring to the example of FIG. 13(b), a GID can be assigned according to a position of an AID. In this case, AIDs using an identical GID can be represented by a value of an offset and a length. For example, if a GID 1 is represented by an offset A and a length B, it means that AIDs ranging from A to A+B−1 have the GID 1 on a bitmap. For example, in the example of FIG. 13(b), assume that the total AIDs ranging from 1 to N4 are divided into 4 groups. In this case, AIDs belonging to the GID 1 correspond to AIDs ranging from 1 to N1 and the AIDs belonging to the GID 1 can be represented by an offset 1 and a length N1. AIDs belonging to a GID 2 can be represented by an offset N1+1 and a length N2−N1+1, AIDs belonging to a GID 3 can be represented by an offset N2+1 and a length N3−N2+1 and AIDs belonging to a GID 4 can be represented by an offset N3+1 and a length N4−N3+1.

As mentioned in the foregoing description, if an AID assigned based on a group is introduced, it is able to make channel access to be permitted in time section different from each other according to a GID. Hence, a TIM element deficiency problem for many numbers of STAs is solved and data can be efficiently transmitted and received. For example, channel access is permitted for STA(s) belonging to a specific group only during specific time section and the rest of STA(s) may have restriction on the channel access. A prescribed time section for which access is permitted for specific STA(s) may be called a RAW (restricted access window).

A channel access according to a GID is explained with reference to FIG. 13(c). FIG. 13(c) shows an example of a channel access mechanism according to a beacon interval when an AID is divided into 3 groups. A first beacon interval (first RAW) corresponds to an interval for which a channel access of an STA corresponding to an AID belonging to a GID 1 is permitted. Channel access of STAs belonging to a different GID is not permitted. To this end, A TIM element for AIDs corresponding to the GID 1 is included in the first beacon only. A TIM element for AIDs including a GID 2 is included in a second beacon frame. Hence, channel access of STAs corresponding to AIDs belonging to the GID 2 is permitted only during a second beacon interval (second RAW). A TIM element for AIDs including a GID 3 is included in a third beacon interval only. Hence, channel access of STAs corresponding to AIDs belonging to the GID 3 is permitted only during a third beacon interval (third RAW). The TIM element for the AIDs including the GID 1 is included again in a fourth beacon interval only. Hence, channel access of the STAs corresponding to the AIDs belonging to the GID 1 is permitted only during a fourth beacon interval (fourth RAW). Channel access of an STA belonging to a specific group, which is indicated by a TIM included in a corresponding beacon frame, is permitted only during each of beacon intervals after a fifth beacon interval (each of RAWs after a fifth RAW).

FIG. 13(c) shows an example of a circular or periodical order of a GID which is permitted according to a beacon interval, by which the present invention may be non-limited. In particular, if AID(s) belonging to a specific GID(s) is included in a TIM element, channel access of STA(s) corresponding to the specific AID(s) can be permitted during specific time interval (specific RAW) and channel access of the rest of STA(s) may not be permitted during the specific time interval.

Figure 13:
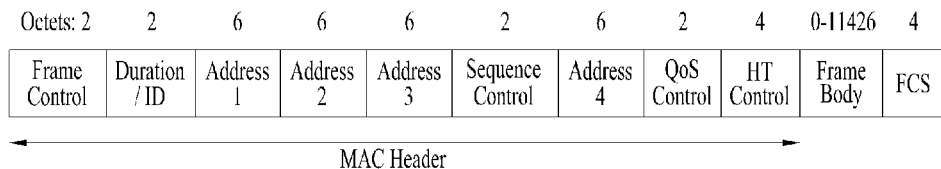
FIG. 13 is a diagram for an example of an MAC frame format of IEEE 802.11 system to which the present invention is applicable.

As mentioned in the foregoing description, the group-based AID assignment scheme can also be called a hierarchical structure of a TIM. In particular, a total AID space is divided into a plurality of blocks and it is able to make channel access of STA(s) (i.e., STA of a specific group) corresponding to a specific block including a value except 0 to be permitted only. By doing so, a TIM of a large size is divided into a small blocks/groups, an STA can easily maintain TIM information and the blocks/groups can be easily managed according to a class of an STA, service quality (QoS), or a usage. Although the example shown in FIG. 13 shows a 2-level layer, it is able to configure a TIM of a hierarchical structure in a form equal to or greater than the 2 levels. For example, a total AID space is divided into a plurality of page groups, each page group is divided into a plurality of blocks and each block can be divided into a plurality of sub-blocks. In this case, as an extended example of the example shown in FIG. 13(a), in an AID bitmap, first N1 number of bits indicate a page ID (i.e., PID), next N2 number of bits indicate a block ID, next N3 number of bits indicate a sub-block ID and the remaining bits can indicate an STA bit position in a sub-block.

In the examples of the present invention described in the following, it is able to apply various methods of dividing STAs (or AIDs assigned to each of the STAs) in a prescribed hierarchical group unit and managing the STAs. A group-based AID assignment scheme may be non-limited by the examples.

Examples of Frame Format

FIG. 13 is a diagram for an example of an MAC frame format of IEEE 802.11 system to which the present invention is applicable.

Referring to FIG. 13, a MAC frame format includes a MAC header (MHR), a MAC payload and a MAC footer (MFR). The MHR is defined by a region including a frame control field, a duration/ID field, an address 1 field, an address 2 field, an address 3 field, a sequence control field, an address 4 field, a QoS control field and a HT control field. A frame body field is defined by the MAC payload. Data intended to be transmitted by upper layer is positioned at the frame body field. The frame body field has a variable size. A frame check sequence (FCS) field is defined by the MAC footer and is used to detect an error of the MAC frame.

A minimum frame format is configured by the first three fields (the frame control field, the duration/ID field and the address 1 field) and a very last field (the FCS field). The first three fields and the last field exist in all frames. The remaining fields can exist in a specific frame type only.

Information included in each of the aforementioned fields may follow the definition of IEEE 802.11 system. And, the each of the aforementioned fields corresponds to an example of fields capable of being included in a MAC frame. Each field can be replaced with a different field or an additional field can be further included as well.

Figure 14:
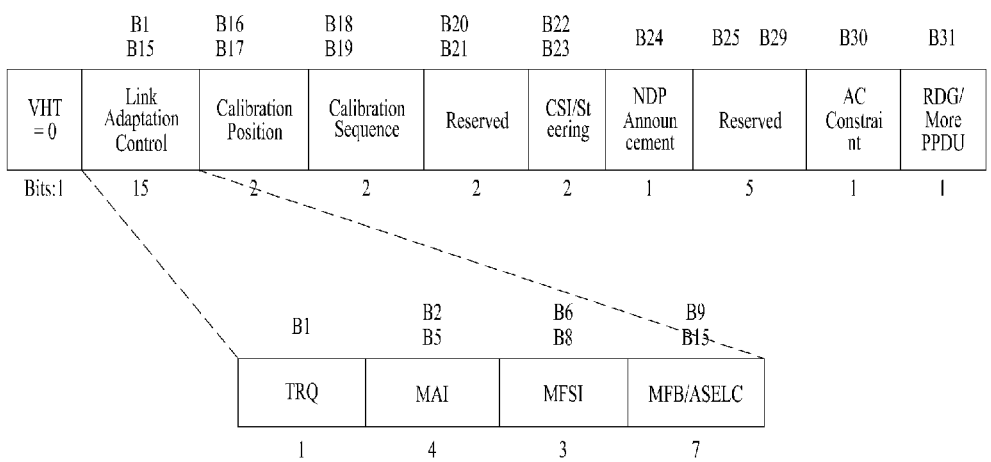
FIG. 14 is a diagram for an example of an HT format of an HT control field in an MAC frame.

FIG. 14 is a diagram for an example of an HT format of an HT control field in a MAC frame according to FIG. 13.

Referring to FIG. 14, the HT control field can include a VHT subfield, a link adaptation subfield, a calibration position subfield, a calibration sequence subfield, a channel state information(CSI)/steering subfield, an NDP (null data packet) announcement subfield, an AC (access category) constraint subfield, an RDG (reverse direction grant/more) PPDU subfield and a reserved subfield.

The link adaptation subfield can include a training request (TRQ) subfield, an MAI (MCS (modulation and coding scheme) request or an ASEL (antenna selection) indication) subfield, an MCS feedback sequence indication (MFSI) subfield, an MCS feedback and antenna selection command/data (MFB/ASELC) subfield.

If a sounding PPDU is requested to a responder, the TRQ subfield is set to 1. If the sounding PPDU is not requested to the responder, the TRQ subfield is set to 0. And, if the MAI subfield is set to 14, it indicates an antenna selection indication (ASEL indication) and the MFB/ASELC subfield is interpreted by the antenna selection command/data. Otherwise, the MAI subfield indicates an MCS request and the MFB/ASELC subfield is interpreted by an MCS feedback. When the MAI subfield indicates an MCS request (MRO), if MCS feedback is not requested, the MAI subfield is set to 0. If the MCS is requested, the MAI subfield is set to 1. The sounding PPDU indicates a PPDU delivering a training symbol usable for channel estimation.

The aforementioned each of the subfields corresponds to an example of subfields capable of being included in the HT control field. Each field can be replaced with a different subfield. Or, an additional subfield can be further included.

Figure 15:
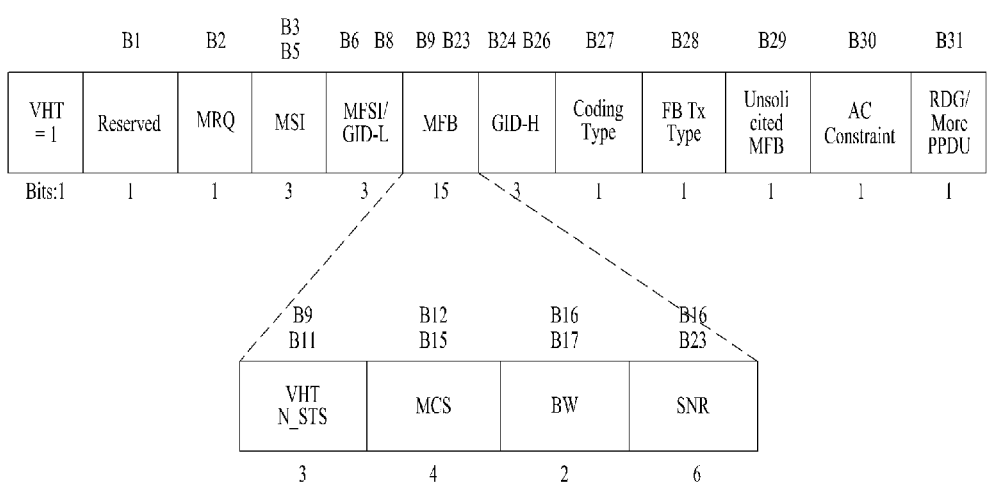
FIG. 15 is a diagram for an example of a VHT format of an HT control field in an MAC frame.

FIG. 15 is a diagram for an example of a VHT format of an HT control field in a MAC frame according to FIG. 13.

Referring to FIG. 15, the HT control field can include a VHT subfield, an MRO subfield, an MSI subfield, an MCS feedback sequence indication/group ID lowest bit (MFSI/GID-L: LSB of group ID) subfield, an MFB subfield, a group ID highest bit (GID-H: MSB of group ID) subfield, a coding type subfield, an MFC response transmission type (FB Tx type: transmission type of MFB response) subfield, an unsolicited MFB subfield, an AC constraint subfield, an RDG/more PPDU subfield. And, the MFB subfield can include a VHT space-time stream number (N STS: number of space time streams) subfield, an MCS subfield, a bandwidth (BW) subfield and a signal to noise ratio (SNR) subfield.

Table 1 shows explanation on each subfield in a VHT format of the HT control field.

TABLE 1

| Subfield | Meaning | Definition |
|---|---|---|
| MRQ | MCS request | If MCS feedback (solicited MFB) is requested, set to 1. Otherwise, set to 0. |
| MSI | MRO sequence identifier | If MRO subfield is set to 1, MSI subfield includes sequence number within a scope ranging from 0 to 6 identifying a specific request. If MRO subfield is set to 0, MSI subfield is reserved. |
| MFSI/GID-L | MFB sequence identifier/LSB of group ID | If unsolicited MFB subfield is set to 0, MFSI/GID-L subfield includes a reception value of MSI included in a frame indicated by MFB information. If unsolicited MFB subfield is set to 1, MFSI/GID-L subfield includes lowest 3 bits of a group ID of PPDU indicated by solicited MFB. |
| MFB | VHT N_STS, MCS, BW, SNR feedback | MFB subfield includes a recommended MFB. MCS = 15, VHT N_STS = 7 indicate that there is no feedback. |
| GID-H | MSB of group ID | If unsolicited MFB subfield is set to 1, GID-H subfield includes highest 3 bits of a group ID of PPDU indicated by the unsolicited MFB. |
| Coding type | Coding type of MFB response | If unsolicited MFB subfield is set to 1, coding type subfield includes 1 in case of coding information (BCC (binary convolution code)) indicated by the unsolicited MFB, 0 in case of LDPC (low-density parity check). Otherwise, reserved. |
| FB Tx type | Transmission type of MFB response | If unsolicited MFB subfield is set to 1 and FB Tx type subfield is set to 0, the unsolicited MFB indicates either unbeamformed VHT PPDU or transmit diversity using STBC (space-time block coding) VHT PPDU. If unsolicited MFB subfield is set to 1 and FB Tx type subfield is set to 1, the unsolicited MFB indicates beamformed SU-MIMO (single user MIMO) VHT PPDU. Otherwise, reserved. |
| Unsolicited MFB | Unsolicited MCS feedback indicator | If MFB is not a response of MRQ, set to 1. If MFB is a response of MRQ, set to 0. |
| Ac constraint | | If response for reverse direction grant (RDG) includes data frame from a traffic identifier (TID), set to 0. If response for reverse direction grant (RDG) includes a frame received from AC identical to last data frame received from an identical |

TABLE 1-continued

| Subfield | Meaning | Definition |
|---|---|---|
| RDG/more PPDU | | reverse direction (RD) initiator only, set to 1. When RDG/more PPDU subfield corresponds to 0, if reverse direction (RD) initiator transmits, it indicates there is no reverse direction grant (RDG). If reverse direction (RD) responder transmits, it indicates PPDU delivering MAC frame is last transmission. When RDG/more PPDU subfield corresponds to 1, if reverse direction (RD) initiator transmits, it indicates there exists reverse direction grant (RDG). If reverse direction (RD) responder transmits, there exist following different PPDU after PPDU delivering MAC frame. |

The aforementioned each of the subfields corresponds to an example of subfields capable of being included in the HT control field. Each field can be replaced with a different subfield. Or, an additional subfield can be further included.

In the meantime, the MAC sub-layer delivers an MAC protocol data unit (MPDU) to a physical layer as a physical service data unit (PSDU). A PCCP entity adds a physical header and a preamble to the received PSDU and generates a PLCP protocol data unit (PPDU).

Figure 16:
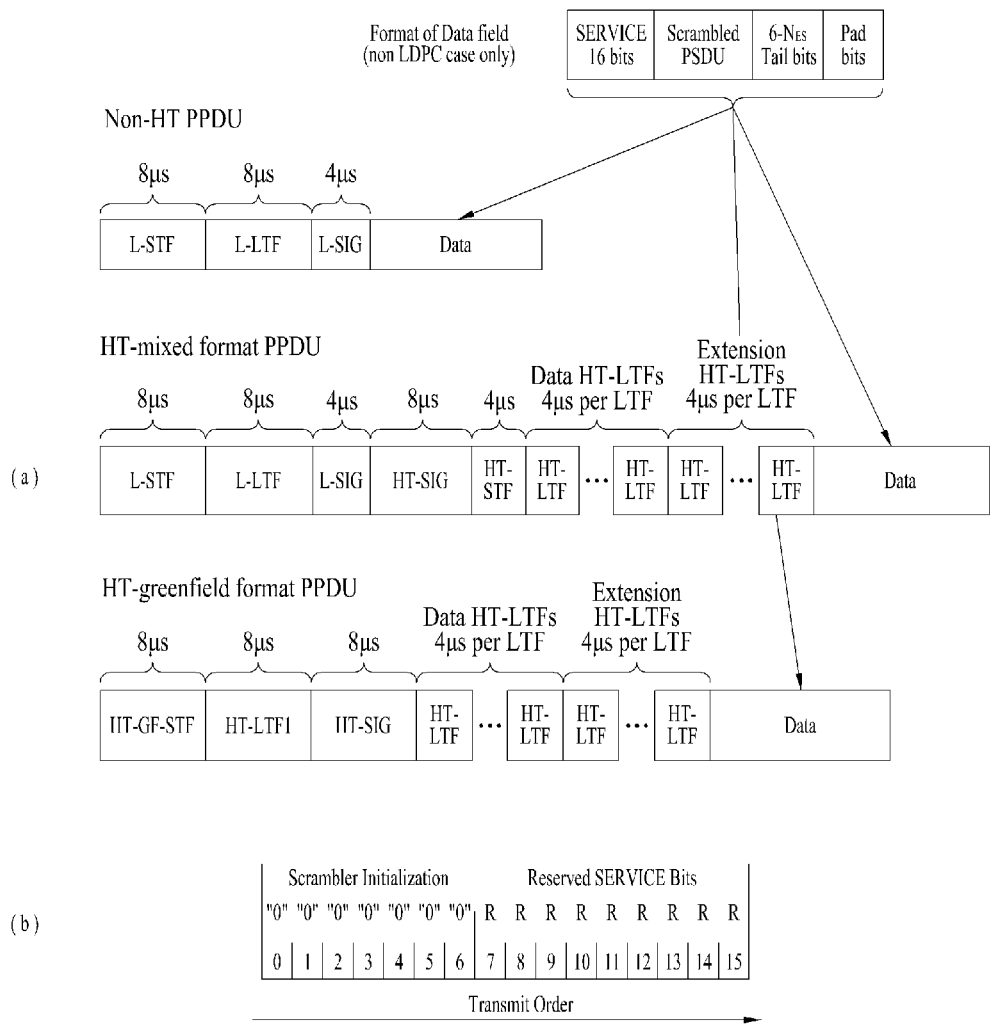
FIG. 16 is a diagram for an example of a PPDU frame format of IEEE 802.11n system.

FIG. 16 is a diagram for an example of a PPDU frame format of IEEE 802.11n system to which the present invention is applicable.

FIG. 16(a) shows an example of a PPDU frame according to a non-HT format, an HT mixed format and an HT-greenfield format.

The non-HT format indicates a frame format for a legacy system (IEEE 802.11a/g) STA. A non-HT format PPDU includes a legacy format preamble consisting of a legacy-short training field (L-STF), a legacy-long training field (L-LTF) and a legacy-signal (L-SIG) field.

The HT mixed format permits a communication with a legacy system STA and indicates a frame format for IEEE 802.11n STA at the same time. The HT mixed format PPDU includes a legacy format preamble consisting of the L-STF, the L-LTF and the L-SIG and an HT format preamble consisting of an HT-short training field (HT-STF), an HT-long training field (HT-LTF) and an HT-signal (HT-SIG) field. Since the L-STF, the L-LTF and the L-SIG mean legacy fields for backward compatibility, a part from the L-STF to the L-SIG is identical to the non-HT format. An STA can identify the mixed format PPDU using the HT-SIG field appearing after the part.

The HT-greenfield format is a format not compatible with a legacy system. The HT-greenfield format indicates a format used for an IEEE 802.11n STA. an HT-greenfield format PPDU includes a greenfield preamble consisting of an HT-greenfield-STF (HT-GF-STF), an HT-LTF1, an HT-SIG and one or more HT-LTFs.

A data field includes a service field, PSDU, tail bit and pad bit. All bits of the data field are scrambled.

FIG. 16(b) shows the service field included in the data field. The service field has 16 bits. Each bit is numbered by 0 to 15. Each bit is sequentially transmitted from a bit #0 The bit #0 to a bit #6 are set to 0 and used to synchronize a descrambler installed in a receiving end.

Figure 17:
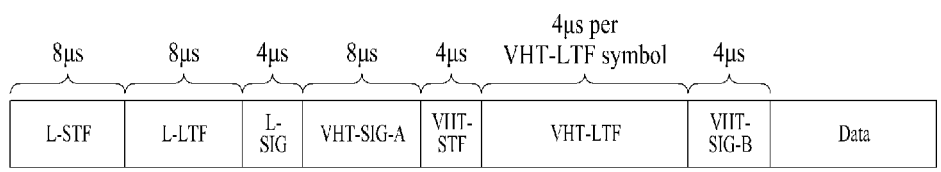

FIG. 17 is a diagram for an example of a VHT PPDU frame format of IEEE 802.11ac system to which the present invention is applicable.

Referring to FIG. 17, a VHT format PPDU includes a legacy format preamble consisting of L-STF, L-LTF and L-SIG and a VHT format preamble consisting of VHT-SIG-A, HT-STF and HT-LTF before a data field. Since the L-STF, the L-LTF and the L-SIG mean a legacy field for backward compatibility, a part from the L-STF to the L-SIG is identical to the non-HT format. An STA can identify the VHT format PPDU using the VHT-SIG field appearing after the part.

The L-STF is a field used for frame detection, auto gain control (AGC) diversity detection, coarse frequency/time synchronization, and the like. The L-LTF is a field used for fine frequency/time synchronization, channel estimation, and the like. The L-SIG is a field used for transmitting legacy control information. The VHT-SIG-A is a VHT field used for transmitting control information included in VHT STAB in common. The VHT-STF is a field used for AGC for MIMO and a beamformed stream. The VHT-LTFs is a field used for channel estimation for MIMO and a beamformed stream. The VHT-SIG-B is a field used for transmitting control information specific to each STA. Structures of the VHT-SIG-A and the VHT-SIG-B are shown in FIG. 18(a) and FIG. 18(b), respectively.

FIG. 19 is a diagram for an example of a PPDU format in 11ax.

Referring to the example of FIG. 19(a), HE-SIG1 appears right after L-part (L-STF, L-LTF, L-SIG). Similar to the L-part, the HE-SIG1 is duplicated in a unit of 20 MHz The HE-SIG1 includes common information (BW, GI length, BSS index, CRC, Tail, etc.). Referring to the structure of FIG. 19(b), the HE-SIG1 includes user allocation information (e.g., STA's ID (PAID or GID), allocated resource information, Nsts, etc.). HE-SIG2 is transmitted per OFDMA allocation. In case of performing MU-MIMO, the HE-SIG2 is identified by an STA via SDM. The HE-SIG2 includes additional user allocation information (e.g., MCS, coding, STBC, TXBE, etc.). Referring to FIG. 19(c), the HE-SIG2 is transmitted immediately after the HE-SIG1 via information (numerology) of the HE-SIG1 over the full band. The HE-SIG2 includes user allocation information (e.g., STA AID, resource allocation information (e.g., allocation size), MCS, Nsts, coding, STBC, TXBF, etc.).

Figure 20:
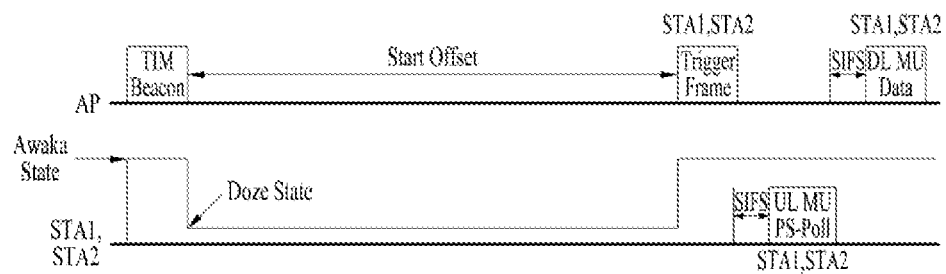
FIG. 20 is a diagram for an example of 11ax MU PS poll.

FIG. 20 is a diagram for an example of 11ax MU PS poll. An AP transmits a TIM beacon frame. The TIM beacon frame can include information necessary for STAs performing MU transmission to receive a trigger frame (e.g., resource allocation, start offset, trigger frame transmission timing, etc.). If an STA receives a trigger frame from the AP, the STA can perform the MU transmission after prescribed time (e.g., SIFS). The AP can transmit DL MU data or ACK to the MU STA after SIFS.

Figure 21:
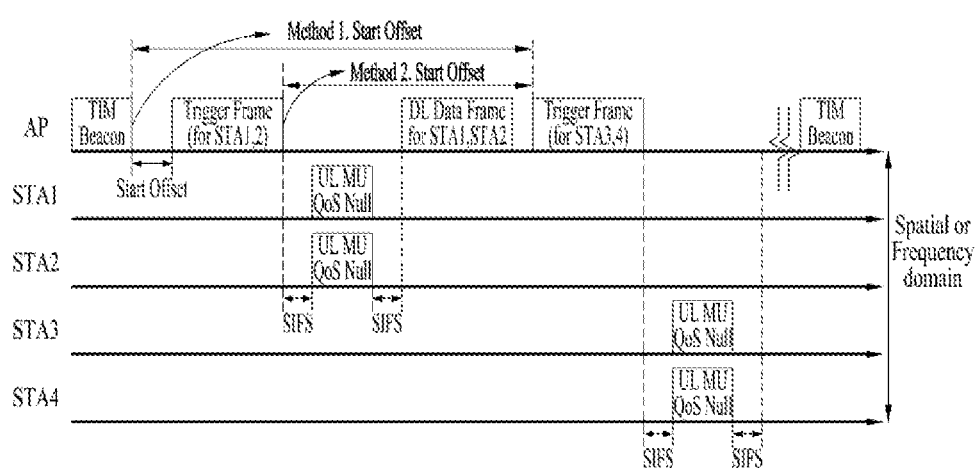
FIG. 21 is a diagram for an example of a UL MU U-APSD operation.

FIG. 21 is a diagram for an example of a UL MU U-APSD operation. If STAs receive TIM from an AP, the STAs obtain transmission information of a trigger frame, receive the trigger frame, and may be able to transmit a UL MU QoS null frame to the AP. Having received the UL MU QoS null frame, the AP can transmit DL data after SIFS. In this case, the transmission information of the trigger frame can be informed in a manner that TIM indicates a start offset of a trigger frame to be received by each STA (method 1) or each trigger frame indicates a start offset for a different STA (method 2).

Figure 22:
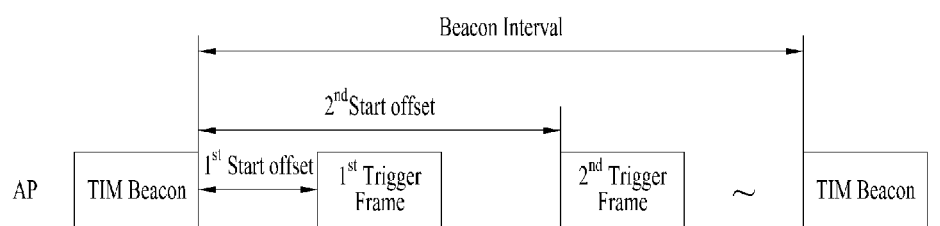
FIG. 22 is a diagram for an example of transmitting a plurality of trigger frames.

FIG. 22 is a diagram for an example of transmitting a plurality of trigger frames during a single beacon interval. In this case, a TIM beacon frame can transmit start off information for each of a plurality of the trigger frames.

In the following, a method of transmitting and receiving a trigger according to embodiments of the present invention and an apparatus capable of maximizing a power saving (PS) effect are explained based on the aforementioned description. In the following description, assume that a UE supports UL MU Tx using UL MU-MIMO and UL OFDMA. For clarity, UL MU is mainly explained in the following description. Yet, following description can also be similarly applied to SU. As an example to which the present invention is applied, if an STA has a restriction in performing SU transmission due to an AP or an STA is unable to perform SU transmission due to data required to be transmitted via a narrow band channel, it may be able to allocate a UL MU resource of a narrow band through a trigger frame. In this case, it may be able to include STA ID information scheduled by the trigger frame and trigger frame transmission time information in a beacon irrespective of TIM indicating DL data to improve PS of a UE. In the following description, for clarity, both a UL MU PS-Poll operation and a UL MU A-APSD operation of 802.11ax are defined and used as a UL MU PS operation. And, contents explained as single trigger frame transmission can be applied to multiple trigger frame transmission. In the following description, an STA may correspond to either a PS STA or a U-APSD STA.

Information Included/Related in/to Trigger Frame Information 1

According to one embodiment of the present invention, an STA receives a beacon frame including TIM information and trigger frame information and may be then able to enter a doze mode. An AP can transmit the trigger frame information including a start offset value indicating transmission timing of a trigger frame in the beacon frame, a resource, the number of STAs receiving the trigger frame, an AID (or a partial AID, a MAC ID, etc.), and the like. In this case, the trigger frame information can include trigger frame type information indicating whether the trigger frame is used for scheduling access or random access.

The AP can inform the STA of the trigger frame type information using two methods described in the following.

As a first method, the AP can inform the STA of information indicating whether a trigger frame corresponds to a scheduling access trigger frame or a random access trigger frame.

The AP can transmit information (e.g., start off or resource indicating transmission timing, AID of an allocated STA) of a trigger frame to the STA together with information indicating whether the trigger frame corresponds to a scheduling access trigger frame or a random access trigger frame in a beacon frame. It may be able to define a field indicating whether a trigger frame corresponds to a scheduling access trigger frame or a random access trigger frame among fields indicating the trigger frame information. For example, if a value of the field corresponds to 1, it indicates a scheduling access trigger frame. On the contrary, if the value of the field corresponds to 0, it may indicate a random access trigger frame.

Having received the TIM information and the trigger frame information (e.g., start off or resource indicating transmission timing, AID of an allocated STA, information indicating whether a trigger frame corresponds to a scheduling access trigger frame or a random access trigger frame, etc.) from the AP, if a bit corresponding to an AID of the STA is set to 1 in the TIM, the STA can maintain the doze mode until a trigger frame for triggering PS-Poll or QoS Null, BSR, etc. is received. In this case, in order to transmit the PS-Poll of a PS STA, QoS Null, BSR, and the like, a trigger frame for triggering, i.e., a trigger frame for triggering random access, a trigger frame for triggering scheduling access, or a trigger frame irrespective of the two access types transmitted by the AP can be defined in advance or can be determined via an association procedure for UL MU capacity. Or, if resource allocation information for the scheduling access and resource allocation information for the random access are mixed in a single trigger frame, or if the AP transmits a trigger frame for the scheduling access and a trigger frame for the random access at the same time at specific timing, the AP can transmit information (e.g., start off or resource indicating transmission timing, an AID of an allocated STA, information indicating whether a trigger frame corresponds to a scheduling access trigger frame or a random access trigger frame, etc.) in every unit allocated to each STA or a resource allocation unit to a beacon frame.

If the trigger frame type information corresponds to 1, it indicates that a trigger frame corresponds to a scheduling access trigger frame. If the trigger frame type information corresponds to 0, it indicates that a trigger frame corresponds to a random access trigger frame. If an STA is configured to use the scheduling access trigger frame, the STA can maintain the doze mode until the trigger frame of which the trigger frame type information is set to 1 is received. Hence, if the trigger frame type information is set to 1, the STA receives a trigger frame based on the information indicated by the trigger frame information and may be then able to perform MU transmission on one selected from the group consisting of a PS-Poll frame, a QoS Null frame, and a BSR frame. Or, the STA may switch to an awake mode at the timing of transmitting a trigger frame. If a beacon does not transmit a resource of a trigger frame transmitted for a specific STA, the STA receives the entire channels to check whether or not the trigger frame transmitted for the specific STA is transmitted and receives a trigger frame transmitted for the STA. Having received the scheduling access trigger frame, the STA can transmit PS-Poll, QoS Null, or BSR to UL MU using a resource allocated to the STA.

When a PS STA or a U-APSD STA is configured to trigger transmission of PS-Poll, QoS Null, BSR, and the like using a random access trigger frame, if a bit corresponding to an AID of the PS STA or the U-APSD STA is set to 1 in TIM of a beacon frame and the PS STA or the U-APSD STA recognizes that an AP has data to be transmitted to the PS STA or the U-APSD STA, an STA receives information indicating whether a trigger frame corresponds to a scheduling access beacon frame or a random access beacon frame and information (e.g., start off or resource indicating transmission timing, and the like) of the trigger frame and may be able to maintain the doze mode until the random access trigger frame is received. Subsequently, the STA switches to the awake mode at the timing of transmitting a trigger frame, receives the random access trigger frame, and may be then able to transmit PS-Poll, QoS Null, or BSR to UL MU via random access.

As a second method, the AP can inform the STA of information on whether or not resource allocation information for random access exists (and/or information on whether or not resource allocation information for scheduling access exists).

If the resource allocation information for scheduling access and the resource allocation information for random access coexist in a trigger frame, the AP can transmit information (e.g., start off or resource indicating transmission timing, AID of an STA, etc.) together with the information on whether or not resource allocation information for random access exists (or the information on whether or not resource allocation information for scheduling access exists). Or, if the AP transmits a scheduling access trigger frame and a random access trigger frame at the same time at specific timing, the AP can transmit information (e.g., start off or resource indicating transmission timing, AID of an STA, etc.) together with information on whether or not the random access trigger frame exists (or information on whether or not the scheduling access trigger frame exists). In this case, in order to transmit the PS-Poll of a PS STA, QoS Null, BSR, and the like, a trigger frame for triggering (i.e., a trigger frame for triggering random access, a trigger frame for triggering scheduling access, or a trigger frame irrespective of the two access types) can be defined in advance or can be determined via an association procedure for UL MU capacity.

For example, if there is resource allocation information for random access, it can be defined by 1 in advance. If there is no resource allocation information for random access, it can be defined by 0 in advance. In this case, if the AP intends to transmit resource allocation information for scheduling access and resource allocation information for random access together using a single trigger frame, the AP can transmit information (e.g., start off or resource indicating transmission timing, AID of an STA, information on whether or not resource allocation for random access exists, etc.) of a frame to a beacon frame. In this case, a field indicating whether or not resource allocation information for random access exists can be transmitted in a manner of being set to 1. When a PS STA or a U-APSD STA is configured to trigger transmission of PS-Poll, QoS Null, BSR, and the like using the resource allocation information for random access, if an STA receives the information, the STA can maintain the doze mode after the beacon frame is received. The STA can switch to the awake mode in a trigger frame that allocates a resource for random access using a start offset value.

Information Included/Related in/to Trigger Frame Information 2

Subsequently, the trigger frame information can include triggering UL MU frame type information. In this case, the UL MU frame type information can indicate a frame triggered by a trigger frame from among a PS-Poll frame, a QoS Null frame, a UL MU data transmission frame, a BSR (Buffer Status Report), and CSI feedback.

More specifically, the AP can transmit a type of a UL MU frame triggered by a trigger frame in a beacon frame and trigger frame information (e.g., start off or resource indicating transmission timing, AID of an allocated STA, etc.). An STA can maintain the doze mode until a trigger frame (including random access) allocated to the STA is received. Or, if resource allocation for transmitting various UL MU frame types, AID of an allocated STA, and the like are included in a single trigger frame, each of the various UL MU frame types can be transmitted. When an STA receives TIM information and trigger frame information (start off or resource indicating transmission timing, AID of an allocated STA, a type of a triggering UL MU frame, etc.) from the AP, if a bit corresponding to an AID of the STA is set to 1, the STA can maintain the doze mode until a trigger frame for triggering PS-Poll or QoS Null, BSR, and the like is received. In this case, in order to indicate the PS-Poll, the QoS Null, UL MU data transmission, the BSR, CSI feedback, and the like corresponding to UL MU frame types triggered by the trigger frame, each of the UL MU frame types can be defined in advance using x bits (x is a random positive integer). For example, the PS-Poll, the QoS Null, the UL MU data, the BSR, and the CSI feedback can be predefined by '000', '001', '010', '011', and '100', respectively.

For example, the AP configures a triggering UL MU frame type by '000' (to indicate a trigger frame triggering PS-Poll) together with trigger frame information (e.g., start off or resource indicating transmission timing, AID of an allocated STA, etc.) for an STA of which a bit corresponding to an AID of the AP is set to 1 in the TIM of a beacon frame and configures AID information by a random STA AID. Having received the trigger frame information and the AID information, an STA corresponding to the AID maintains the doze mode after the beacon frame is received. The STA switches to the awake mode after the timing at which the trigger frame is transmitted (i.e., after the start off), receives a trigger frame for triggering PS-Poll, and transmits UL MU Ps-poll to the AP after specific time (e.g., SIFS) elapsed.

Information Included/Related in/to Trigger Frame Information 3

The trigger frame information can include information indicating whether or not UL MU transmission of a PS STA is triggered in a trigger frame or information indicating whether or not UL MU transmission of a PS STA is triggered.

The AP can transmit information indicating whether or not a trigger frame triggers UL MU transmission of a PS STA or information indicating whether or not a trigger frame triggers UL MU transmission in a beacon frame and information (e.g., start offset or resource indicating transmission timing, AID of an allocated STA, etc.) of the trigger frame. It may be able to define a field indicating whether or not UL MU transmission of the PS STA is triggered or a field indicating whether or not triggering is performed among fields indicating the trigger frame information. For example, if a bit of the field is set to 1, it may indicate that UL MU transmission of the PS STA is triggered or triggering is performed. If the field is set to 0, it may indicate that the UL MU transmission of the PS STA is not triggered or triggering is not performed. The AP may consider a length of a resource to be allocated for the UL MU transmission to determine whether or not the UL MU transmission of the PS STA is triggered or whether or not the triggering is performed.

After the TIM information and the trigger frame information are received from the AP, if a bit corresponding to an AID of the STA is set to 1 in the TIM, the STA can maintain the doze mode until a trigger frame for triggering PS-Poll or QoS Null, BSR, and the like is received. In this case, the trigger frame for triggering the UL MU transmission of the PS STA can be applied irrespective of a random access trigger frame and a scheduling access trigger frame. If various information (resource allocation, AID of an STA to which a resource is allocated, etc.) for access are included in a trigger frame, the AP transmits the information on whether or not the UL MU transmission of the PS STA is triggered or the information on whether or not the triggering is performed in a unit of a resource or a unit of a trigger frame. Or, when the AP transmits a plurality of trigger frames at the same time at specific timing, the AP can transmit the information on whether or not the UL MU transmission of the PS STA is triggered or the information on whether or not the triggering is performed in a unit of a plurality of the trigger frames.

For example, if a bit corresponding to an AID of a PS STA or a U-APSD STA is set to 1 in TIM of a beacon frame and the PS STA or the U-APSD STA recognizes that the AP has data to be transmitted to the PS STA or the U-APSD STA, an STA receives information (e.g., start off or resource indicating transmission timing, an AID of an allocated STA, etc.) of a trigger frame together with the information on whether or not the UL MU transmission of the PS STA is triggered or the information on whether or not the triggering is performed. The PS STA or the U-APSD STA can maintain the doze mode until a trigger frame for triggering the UL MU transmission of the PS STA or a trigger frame for triggering UL MU transmission is received. Subsequently, the STA switches to the awake mode at the timing at which the trigger frame is transmitted, receives the trigger frame for triggering the UL MU transmission of the PS STA, and transmits PS-Poll or QoS Null, BSR, and the like to UL MU according to the information of the trigger frame.

Information Included/Related in/to Trigger Frame Information 4

The AP can transmit information related to transmission timing of a trigger frame to an STA using a beacon frame, or the like. Having received the information, the STA switches to the doze mode, maintains the doze mode, and may be able to switch to the awake mode at the timing at which the trigger frame is transmitted.

When the STA receives a random access trigger frame, the STA switches to the wake mode at target transmission time using such information as start time of a trigger frame, an STA identifier, and the like included in a beacon frame and may be able to receive a signal for receiving a trigger frame during predetermined specific timing (e.g., a TXOP period or a specific window period informed by the AP via the beacon frame). If a trigger frame is not received during the predetermined specific timing (e.g., a TXOP period or a specific window period informed by the AP via the beacon frame), the STA can switch to the doze mode. Or, if the predetermined specific timing (e.g., a TXOP period or a specific window period informed by the AP via the beacon frame) is elapsed, the STA can switch to the doze mode. Subsequently, the STA maintains the doze mode until the timing at which a different trigger frame transmitted by the AP is transmitted. Subsequently, the STA switches to the awake mode at target transmission timing to attempt to receive the different trigger frame.

The AP may indicate whether or not a trigger frame is additionally transmitted using a cascade bit. The cascade bit can indicate whether or not a trigger frame is additionally transmitted during specific timing (e.g., a TXOP period or a specific window period informed by the AP via a beacon frame). If a cascade bit (or, more data bit) of a random access trigger frame is set to 0 and an STA succeeds in performing channel contention via random access, the STA transmits a UL frame to the AP and wakes up until ACK/BA is received from the AP. If the cascade bit (or, more data bit) of the random access trigger frame is set to 0 and the STA fails to perform channel contention via random access, the STA can immediately switch to the doze mode. If the cascade bit (or, more data bit) of the random access trigger frame is set to 1, the STA wakes up to receive a random access trigger frame capable of being additionally transmitted during specific timing (e.g., a TXOP period or a specific window period informed by the AP via a beacon frame) and may switch to the doze mode when the specific timing (e.g., a TXOP period or a specific window period informed by the AP via a beacon frame) ends. Subsequently, the STA can maintain the doze mode until transmission time of a random access trigger frame or a scheduling access trigger frame transmitted from a beacon arrives. If transmission time of a different random access trigger frame or a scheduling access trigger frame received from a beacon arrives, the STA switches to the wake mode to receive the trigger frame.

Or, the STA receives a random access trigger frame, transmits a resource request frame to UL MU in response to the random access trigger frame, and may be then able to receive a frame including scheduling or resource allocation-related information from the AP. In this case, when the AP receives resource request frames from STAs, if a resource request amount requested by the STAs exceeds a prescribed threshold (or, if the AP determines to allocate a resource to UL MU transmission for the STAs according to resource request frame information transmitted from the STAs), the AP can transmit a frame including scheduling for the UL MU transmission or resource allocation-related information to the STAs.

If the STA fails to occupy a channel or transmits a resource request frame after a random access trigger frame is received or if the STA does not have scheduling information for the STA or resource allocation-related information after a frame including scheduling for UL MU transmission or resource allocation-related information is received, the STA switches to the doze mode and maintains the doze mode until the timing at which a different random access trigger frame indicated by the AP is transmitted or the timing at which a scheduling access trigger frame is transmitted. The STA can switch to the awake mode at the timing at which the different random access trigger frame indicated by the AP is transmitted or the timing at which the scheduling access trigger frame is transmitted. In this case, the AP can inform a trigger frame or a frame (this frame can also be a trigger frame) transmitting scheduling or resource allocation-related information of information on whether or not STAs, which has transmitted UL to UL MU, are able to switch to the doze mode using a more data bit. For example, the AP can additionally inform the frame transmitting scheduling or resource allocation-related information of information on whether or not there is a DL more data for each of the STAs. To this end, it may be able to define not only the scheduling or the resource allocation-related information but also a more data bit to the frame. By doing so, the AP can inform the STA of information on whether or not there is a buffered DL data for the STA. If the more data bit is set to 1, the STA is able to wake up to receive DL data from the AP. If the more data bit is set to 0, the STA switches to the doze mode. If a different random access trigger frame or a scheduling access trigger frame informed by the AP via a beacon frame is transmitted, the STA can switch to the awake mode.

Figure 23:
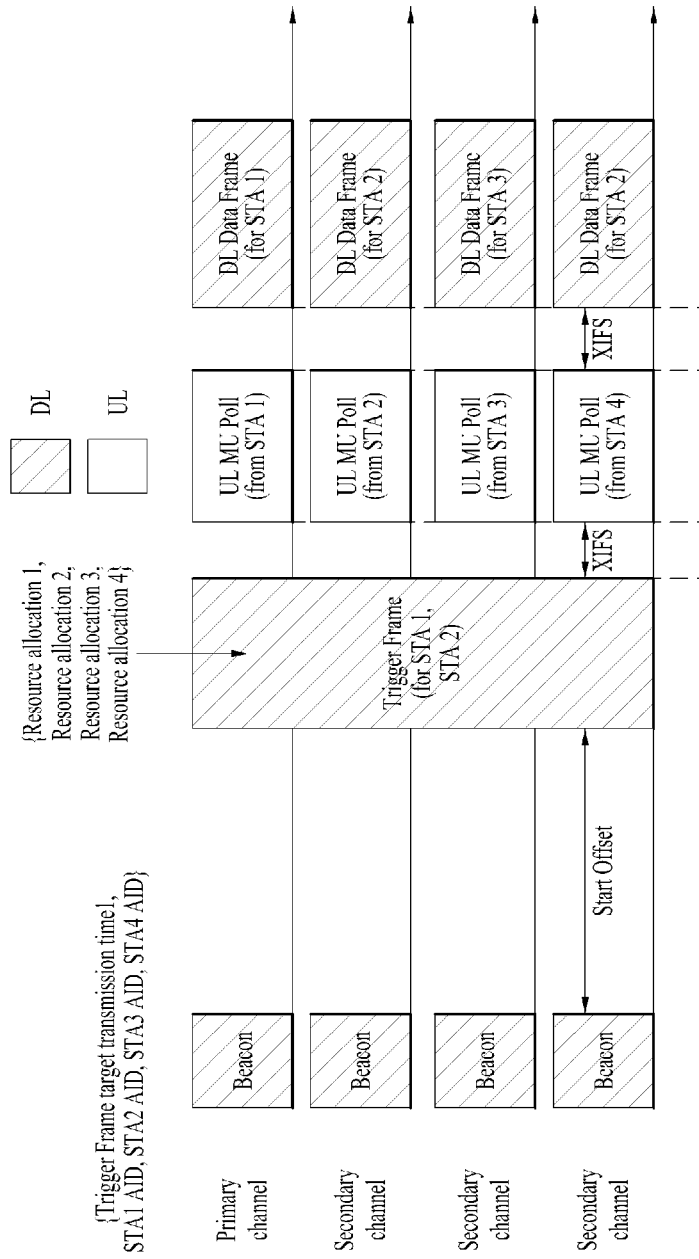
FIGS. 23 to 27 are diagrams for explaining various embodiments of the present invention.

If the AP indicates transmission timing of a scheduling access trigger frame using a beacon frame and transmits an identifier (e.g., (partial) AID, MAC address, etc.) capable of identifying each of STAs, it may be able to transmit resource allocation information in the scheduling access trigger frame according to an order of each of STA identifiers. Or, a mapping rule between an identifier of an STA and resource allocation information can be defined in advance. For example, as shown in FIG. 23, when the AP indicates that scheduling access trigger frames for STAs 1, 2, 3, and 4 are transmitted at stat time 1 via a beacon, the AP can sequentially transmit AID values corresponding to the STAs 1, 2, 3 and 4. The AP transmits the scheduling access trigger frames for the STAs 1, 2, 3, and 4 at the start time 1 and can transmit resource allocation information for UL MU transmission of the STAs 1, 2, 3, and 4 in the trigger frames. In this case, the resource allocation information transmitted in the trigger frames correspond to resource allocation information according to an order of the STAs 1, 2, 3, and 4 and can be transmitted in a manner of being sequentially listed. In particular, the AP transmits information corresponding to the start time 1, (AID of STA 1, AID of STA2, AID of STA 2, AID of STA 3, and AID of STA 4) in a beacon and transmits a scheduling access trigger frame for each of the STAs at the start time 1. Having received the beacon information transmitted by the AP, the STAs wake up at the start time 1 according to AID of the STAs and receive a scheduling access trigger frame. In this case, AID information for each of the STAs is omitted in the scheduling access trigger frame and transmission can be sequentially performed in an order such as {resource allocation for STA 1, resource allocation for STA 2, resource allocation for STA 3, resource allocation for STA4}. Each of the STAs is able to know an order of resource allocation information transmitted for the STA according to the order transmitted via beacon and the STA can perform UL MU transmission using a resource according to resource allocation allocated to the STA.

Since a channel state, a traffic state, an interference state, and the like vary between time of transmitting a beacon and time of transmitting a trigger frame, it may be able to change an order of STAs corresponding to AIDs transmitted by a beacon in consideration of the channel state, the traffic state, the interference state, and the like. A method of changing the order can be performed in various ways. For example, a new order can be directly indicated by allocating a prescribed bit to each AID. It may be able to represent the increase and the decrease of an order. It may be able to additionally represent the extent of change for an AID including a change after information on whether or not a change exists in an order is indicated using a bitmap.

In this case, it may be able to refresh AID information transmitted from a beacon instead of omitting the AID information from a trigger frame. For example, it may be able to indicate whether or not scheduling access for an STA corresponding to an AID transmitted from a beacon is feasible using a bitmap. In particular, although allocation is already performed by a beacon, if it is necessary to change scheduling access not to be allocated to a corresponding STA, a corresponding bit can be configured by 0.

In this case, an indicator indicating a random access resource allocation can be additionally transmitted to a trigger frame. Or, random access resource allocation and scheduling access resource allocation can be transmitted in a manner of being separated. If the random access resource allocation and the scheduling access resource allocation are transmitted in a manner of being mixed and an indicator indicating the random access or the scheduling access is additionally transmitted, each of the STAs is able to know resource allocation information allocated to the STA while skipping the random access resource allocation information.

For example, if the AP transmits information on trigger frames for STAs 1, 2, 3, and 4 transmitted at specific timing via a beacon frame, the STAs 1, 2, 3, and 4 can maintain the doze mode until the specific timing the STAs switch to the awake mode at the specific timing to receive a trigger frame. In this case, if the trigger frame is transmitted in a manner of including {0, resource allocation 1, 0, resource allocation 2, 1, resource allocation 3, 0, resource allocation 4, 0, resource allocation 5}, each of the STAs 1, 2, 3, and 4 is able to know that resource allocation 1, 2, 4, and 5 are allocated for scheduling access of each STA. (1 indicates random access and 0 indicates scheduling access.)

Information Included/Related in/to Trigger Frame Information 6

Figure 24:
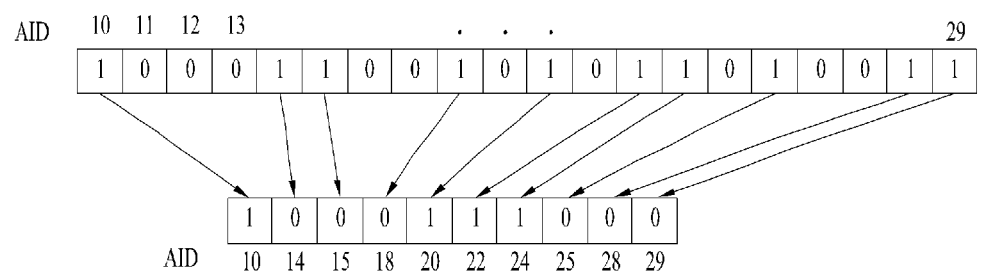

As mentioned in the foregoing description, a beacon frame transmits TIM information together with trigger frame information. In this case, information of STAs scheduled by a trigger frame may correspond to AID information or a TIM bitmap reconfigured by STAs corresponding to 1 in the TIM. More specifically, when the AP transmits information for transmitting a trigger frame in a beacon frame to transmit a trigger frame for transmitting PS-Poll or QoS Null frame or BSR of a PS STA or a U-APSD STA, i.e., when the AP transmits information on STAs, which have received transmission timing of a trigger frame and the trigger frame, it may be able to newly configure a bitmap consisting of STAs including positive TIM only. In this case, it may be able to additionally transmit information indicating a variable bitmap length. In this case, a bit value 1 of the newly configured bitmap corresponds to an AID of an STA to which information of an STA scheduled by a trigger frame is transmitted. For example, as shown in FIG. 24, if a TIM bit of STAs of which an AID corresponds to 10, 14, 15, 18, 20, 22, 24, 25, 28, and 29 is positive in the TIM, it may be able to indicate information of the STAs scheduled by the trigger frame by newly configuring a bitmap indicating the AIDs of the positive STAs. According to the example described in the following, it is able to indicate that a trigger frame for STAs of which an AID corresponds to 10, 20, 22, and 24 is transmitted. In case of applying the abovementioned method, STAs, which are going to schedule UL MU transmission using a trigger frame in TBTT, can configure the TIM as positive although there is no DL data. In this case, if the TIM is negative, an STA switches to the doze mode and maintains the doze mode during the TBTT until a next beacon is received although there is UL data.

As a different example, it may be able to transmit a group ID, multiple STA identifiers (e.g., AID, partial AID, MAC address), or a number value of a trigger frame in an ACK/BA frame, which is transmitted to an STA in which BSR is transmitted.

Having received the BSR transmitted by the STA, the AP can transmit ACK/BA to the STA in response to the BSR. In this case, if a group ID, multiple STA identifiers (e.g., AID, partial AID, MAC address), or a number of a trigger frame is included in an ACK/BA frame or an M-BA frame, the AP can transmit the number value of the trigger frame to the STA. In this case, DTIM count can be included in the number value of the trigger frame. In particular, it may be able to indicate an order of trigger frames in which a specific DTIM count value is transmitted in TBTT. For example, it may be able to transmit AID of an STA, a partial MAC address and identifiers (e.g., AID, partial AID, MAC address) of multiple allocated STAs, a group ID, or a number value of a trigger frame via an RA field of an ACK frame. In case of a BACK frame, it may be able to transmit identifiers (e.g., AID, partial AID, MAC address) of multiple allocated STAs, a group ID, or a number value of a trigger frame via reserved bits of per TIM Info subfield. Or, it may be able to transmit identifiers (e.g., AID, partial AID, MAC address) of multiple allocated STAs, a group ID, or a number value of a trigger frame using a predefined specific TID value.

The AP can transmit the group ID, the multiple STA identifiers (e.g., AID, partial AID, MAC address), or the number value of the trigger frame and information corresponding to transmission timing of the trigger frame using a beacon. Having received the information, the STA switches to the doze mode and maintains the doze mode until transmission timing of a trigger frame corresponding to multiple STA identifiers (e.g., AID, partial AID, MAC address), a group ID, or a number value of a trigger frame using an ACK/BACK frame for a legacy BSR transmission. The STA switches to the awake mode at the transmission timing of the trigger frame to receive the trigger frame.

Trigger Frame and Priority

It may be able to determine priority among transmission via a scheduling access trigger frame, transmission via a random access trigger frame, and transmission via SU. The priority can be configured by an AP or an STA. Or, the priority can be defined in advance.

If a bit corresponding to an AID of a PS STA or a U-APSD STA is set to 1 in TIM of a beacon frame and information on resource allocation for the PS STA or the U-APSD STA is included in trigger frame information transmitted from a beacon, an STA may not transmit PS-Poll or QoS null until the trigger frame is received after an SU or a random access trigger frame is received. Or, if a bit corresponding to an AID of a PS STA or a U-APSD STA is set to 1 in TIM of a beacon frame, information on resource allocation for the PS STA or the U-APSD STA is not included in trigger frame information transmitted from a beacon, and trigger frame information for random access is included in the trigger frame information, an STA may not transmit PS-Poll or QoS null until a random access trigger frame is received.

If a bit corresponding to an AID of a PS STA or a U-APSD STA is set to 1 in TIM of a beacon frame and information on resource allocation for the PS STA or the U-APSD STA and trigger frame information for random access are included in trigger frame information transmitted from a beacon, an STA attempts to access to transmit PS-Poll, QoS Null, and a QoS data frame to UL MU by receiving a scheduling access trigger frame, attempts to access to transmit PS-Poll, QoS Null, and a QoS data frame to UL MU by receiving a random access trigger frame, and attempts to access to transmit PS-Poll, QoS Null, and a QoS data frame to SU, independently. In this case, the SU can be included or excluded in/from the independently applying method. In particular, PS-Poll or QoS null can be transmitted by preferentially occupying a resource via access. For example, a PS STA receives a random access trigger frame before a scheduling access trigger frame indicated by a beacon is received, performs random access on a resource allocated by a trigger frame to occupy the resource, and transmits PS-poll or QoS null to UL MU. Subsequently, the PS STA can receive DL data from the AP. In this case, if the AP sets a more data field of the DL data to 0, it is not necessary for the STA to switch to the awake mode to receive the scheduling access trigger frame indicated by the beacon. Or, if the AP sets the more data field of the DL data to 1, the STA switches to the awake mode to receive the scheduling access trigger frame indicated by the beacon and receives a trigger frame for triggering PS-poll. Subsequently, the STA can transmit UL MU PS-poll to the AP after specific time (e.g., SIFS) elapsed. In this case, in order to transmit PS-poll to SU, the STA may not perform access.

Meanwhile, when a UE performs random access, it may decrease a backoff count (or CW) value whenever a trigger frame is received. When the backoff count (or CW) value becomes 0, it may be able to perform access by randomly select a resource from among resources allocated by the trigger frame for random access. The backoff counter value can be decreased according to each of frequency resources for random access (a resource according to a usage) allocated by the trigger frame. In this case, in order to obtain PS of UEs, the AP can transmit information corresponding to a resource amount of a backoff rule during TBTT to which a backoff count (or CW) is applied in a beacon frame. For example, when backoff is performed in a unit of a transmitted trigger frame, the AP can transmit the number of trigger frames. (In this case, the number of trigger frames can be restricted to the number of trigger frames used for allocating a resource for random access). Or, when backoff is performed in a unit of a frequency resource (e.g., a sub-channel unit or an OFDMA resource allocation unit), the AP can transmit information on the total number of resources for random access such as the number of frequency resources in trigger frames transmitted during TBTT. In particular, it may be able to define a field to transmit information on the total number of trigger frame-based random accesses during TBTT in a beacon frame or the total number of resources of a trigger frame-based random access. The AP can transmit the information via the field. And, the AP may indicate the maximum number of backoff rule resources (e.g., TF-R, random access RU, etc.) capable of being scheduled by the AP rather than the precise number of backoff rule resources (e.g., TF-R, random access RU, etc.) in a beacon frame.

Figure 25:
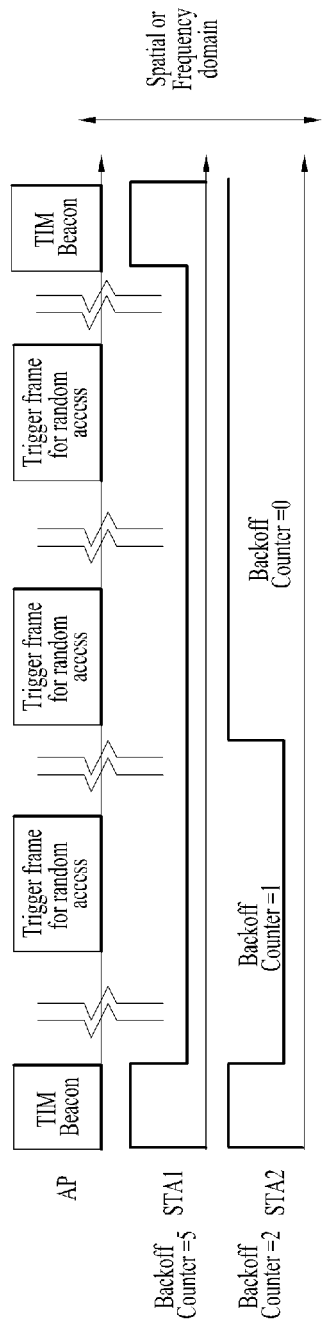

Specifically, referring to FIG. 25, if trigger frames for allocating a resource for random access are transmitted 3 times during specific TBTT, the AP can indicate that the trigger frames for allocating a resource for random access are transmitted 3 times during TBTT via a beacon frame. Among STAs, which have received the beacon frame, an STA 1 of which a backoff count (or CW) value for random access exceeds 3 switches to the doze mode until a next beacon is received to save power (the STA 1 may transmit UL of the STA 1 to SU). Or, if a TIM bit corresponding to an AID of an STA is configured as negative or an STA intends to transmit a UL frame via an unassociated MU, the STA switches to the doze mode until a next beacon is received to save power. Among STAs received via a beacon, an STA 2 of which the backoff count (or CW) value is equal to or less than 3 maintains an active mode or switches to the doze mode using a transmission offset value of a trigger frame transmitted from a beacon until a trigger frame is received to perform PS. The abovementioned processes can be performed at the same time during the TBTT period.

If an STA is indicated by a trigger frame-based random access, the STA transmits a UL frame by performing the random access, and the STA has a frame for UL transmission in a buffer, the STA compares the number of trigger frames to be transmitted during the remaining TBTT period, which is calculated by the total number of trigger frames transmitted from a beacon, with a backoff count (or CW) value reselected by the STA. If the backoff count (or CW) value is equal to or less than the number of trigger frames transmitted during the TBTT period, the STA maintains the active mode. Or, if a beacon transmits information on transmission time during which trigger frames are transmitted to the STA, the STA switches to the doze mode until a trigger frame where the backoff count (or CW) becomes 0 to save power until transmission time at which the trigger frame is transmitted. Subsequently, the STA can switch to the awake mode at which the trigger frame is transmitted.

Figure 26:
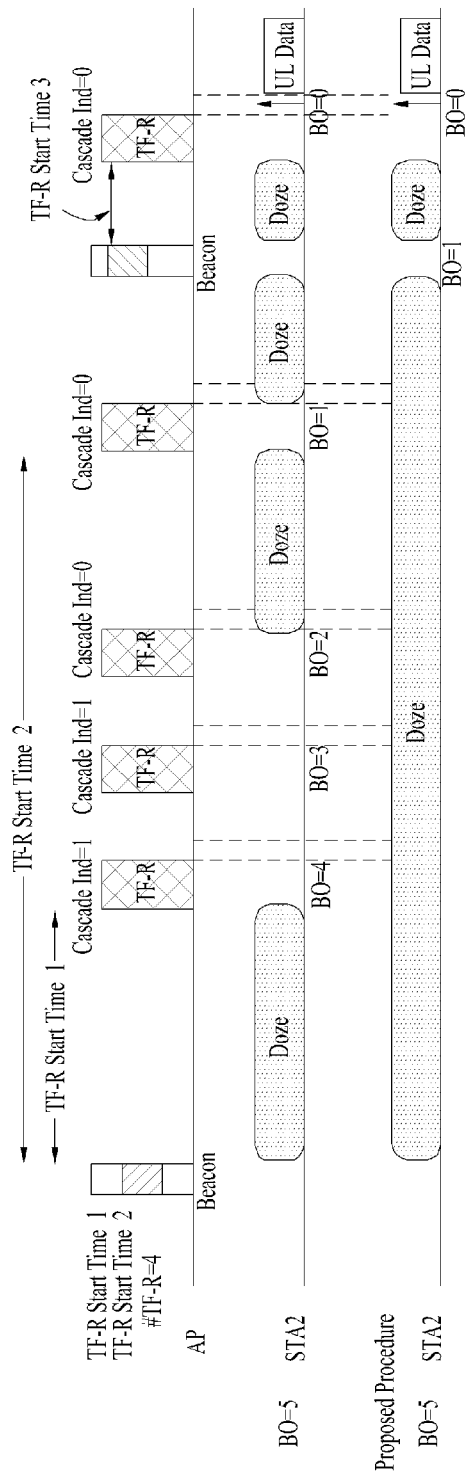

As a different example, the STA compares the number of trigger frames to be transmitted during the remaining TBTT period with a backoff count (or CW) value reselected by the STA. If the backoff count (or CW) value is greater than the number of trigger frames transmitted during the TBTT period, the STA switches to the doze state until a next beacon is transmitted to save power. In this case, the STA can reduce the backoff count (or CW) value as much as resource amount of a backoff rule during TBTT to which the backoff count (or CW) value is applied in a beacon frame indicated by the AP, when the next beacon is transmitted or before the STA switches to the doze mode. In the foregoing description, a method of reducing the backoff count (or CW) in every trigger frame has been explained as an example. Yet, as shown in FIG. 26, a trigger frame may reduce the backoff count (or CW) according to a resource allocated for UL random access. And, the AP can transmit TF or TF-R and a cascade indicator at the same time.

For power saving of an STA, the STA (re)sets a PS timer whenever the STA receives a frame from the AP. If the PS timer is expired, the STA sets a PM bit of a UL frame (e.g., null data frame, etc.) to 1 and transmits the UL frame to the AP. After the frame is exchanged with the AP, the STA switches to the doze mode and maintains the doze mode until a DTIM beacon frame is received to save power. The AP can transmit a PS timer value using a beacon frame or a probe response frame. Or, the PS timer value can be configured in the middle of an association procedure when the AP and the STA perform the association procedure. In particular, if the AP transmits no frame to the STA during the PS timer value, the STA requests for the switch to the doze mode to the AP using a UL frame for PS. If the STA receives acknowledgment from the AP, the STA can switch to the doze mode.

Figure 27:
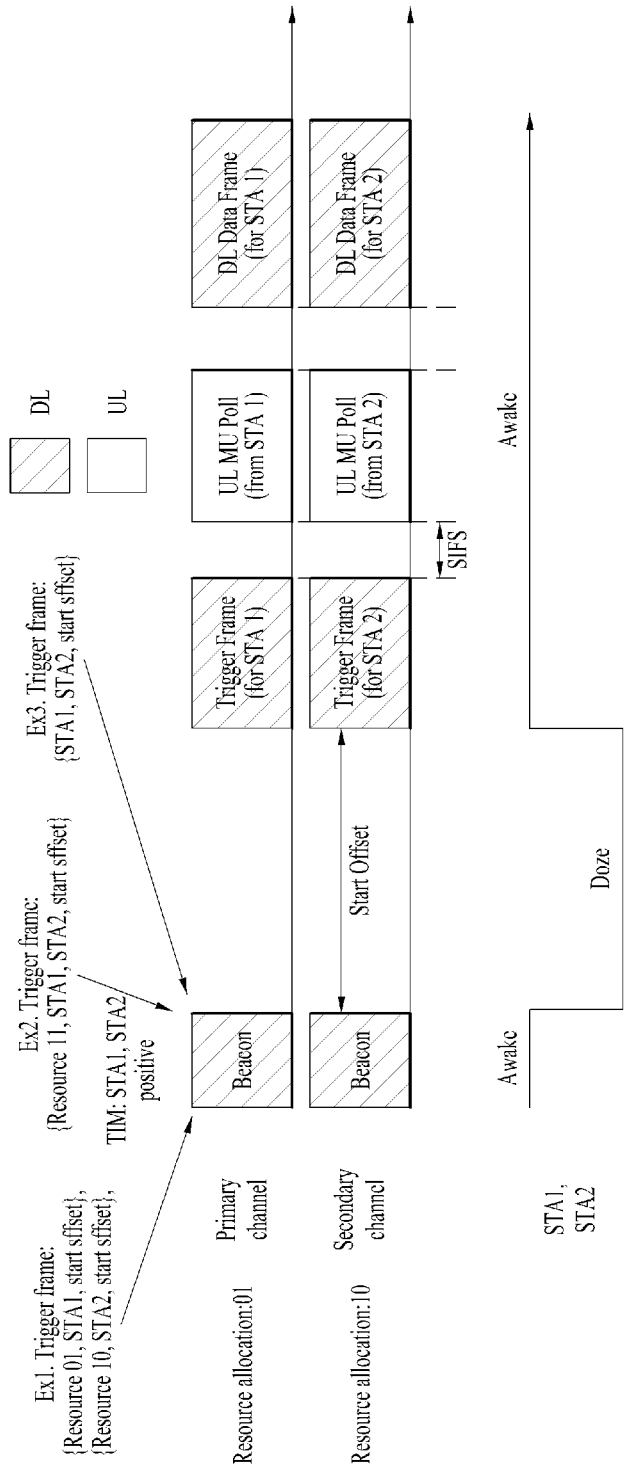

FIG. 27 shows an example of forwarding AID and information on an allocated resource when the aforementioned trigger frame information simply includes information such as a start offset value indicating transmission time of a trigger frame, a resource, the number of STAs receiving a trigger frame, AID (or partial AID, MAC ID, etc.), and the like. Referring to FIG. 27, as shown in an example 1 (Ex1), it may transmit an AID of a receiving STA together with resource information of each trigger frame. As shown in an example 2 (Ex2), it may transmit information on the entire resources in which a trigger frame is transmitted and an AID set of receiving STAs. As shown in an example 3 (Ex3), it may transmit an AID set only of STAs receiving a trigger frame. In this case, in case of transmitting trigger frame information for random access, it may omit AIDs of STAs or transmit a predefined specific AID (e.g., all zero AID). It may be able to indicate an AID set of receiving STAs using a group ID as well as an AID of each STA.

And, the AP can directly/indirectly inform an STA of information on a type of a trigger frame in a beacon frame. The STA is able to know a trigger frame to be received by the STA using the trigger frame type. By doing so, it may obtain a PS effect.

For example, in case of a PS mode STA, the STA can maximize a PS effect using not only a trigger frame allocated to the STA but also additional information on the trigger frame type. In this case, the AP can transmit the information to STAs of which a bit corresponding to an AID of an STA among a PS STA and a U-APSD STA in TIM is set to 1, i.e., STAs having a DL data which is transmitted to a specific STA by the AP. When the AP determines whether to allocate a random access trigger frame or a scheduling access trigger frame to transmit PS-poll or QoS null, BSR (buffer status report), and the like of a PS STA, the AP may consider AC of a DL data to be transmitted. For example, if a DL data is sensitive to delay, the AP can allocate a resource for UL MU transmission using the scheduling access trigger frame. Otherwise, the AP can allocate a resource for UL MU transmission using the random access trigger frame.

Figure 28:
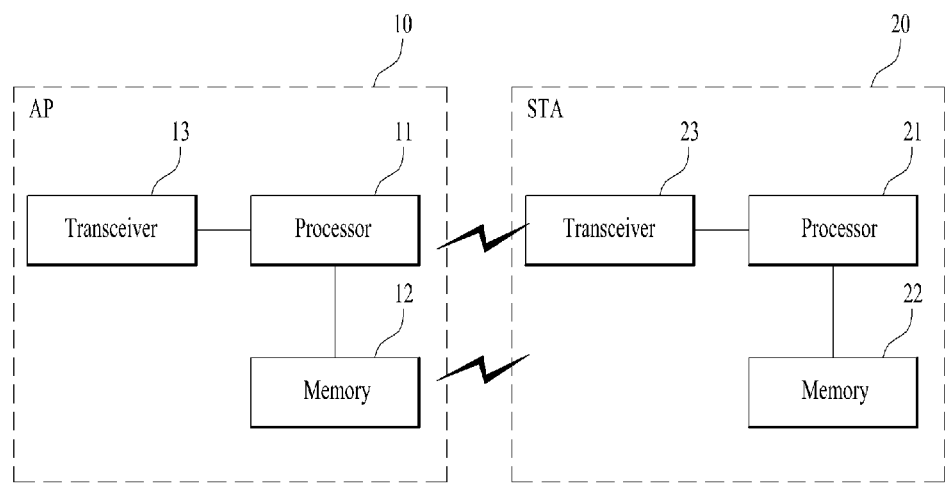
FIG. 28 is a block diagram for a configuration of a wireless device according to one embodiment of the present invention.

FIG. 28 is a block diagram for a configuration of a wireless device according to one embodiment of the present invention.

An AP 10 can include a processor 11, a memory 12, and a transceiver 13. An STA 20 can include a processor 21, a memory 22, and a transceiver 23. The transceiver 13/23 can transmit and receive a radio signal. For example, the transceiver 13/23 can implement a physical layer according to IEEE 802 system. The processor 11/21 can implement a physical layer and/or a MAC layer according to IEEE 802 system in a manner of being connected with the transceiver 13/23. The processor 11/21 can be configured to perform an operation according to the various embodiments of the present invention. A module for implementing operations of the AP 10 and the STA 20 according to the various embodiments of the present invention is stored in the memory 12/22 and can be executed by the processor 11/21. The memory 12/22 is included in the inside of the processor 11/21 or is installed in the outside of the processor 11/21 and can be connected with the processor 11/21 by a well-known means.

For a detailed configuration of the AP 10 and the STA 20, the items mentioned earlier in various embodiments of the present invention can be independently applied or two or more embodiments can be applied at the same time. For clarity, explanation on overlapped contents is omitted at this time.

The embodiments of the present invention may be implemented through various means. For example, the embodiments can be implemented by hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

INDUSTRIAL APPLICABILITY

Although the various embodiments of the present invention are explained centering on IEEE 802.11 system, the embodiments can also be applied to various mobile communication systems with an identical scheme.

What is claimed is:

1. A method for a station (STA) in a wireless local area network (WLAN), the method comprising:
performing, by the STA, an association procedure with an access point (AP) to obtain an association identifier (AID) for the STA;
receiving, from the AP by the STA, a beacon frame comprising a first field related to a transmission time of a trigger frame including frequency resource information to be used for an uplink multi-user (UL MU) transmission, wherein the frequency resource information to be included in the trigger frame includes at least one of a first type resource information used for random access based on orthogonal frequency division multiple access (OFDMA) and a second type resource information scheduled for at least one receiving STA, wherein the beacon frame further comprises a second field related to whether or not the trigger frame includes the first type resource information, wherein the second field includes a first value when the trigger frame includes the first type resource information and the second type resource information, and wherein the second field includes a second value when the trigger frame does not include the first type resource information;
receiving, from the AP by the STA, the trigger frame based on the first field;
determining, by the STA, an UL resource to be used for the UL MU transmission from the first type resource information and the second type resource information included in the trigger frame when the second field has the first value; and
performing, by the STA, the UL MU transmission based on the determination.

2. The method of claim 1, wherein the beacon frame further comprises a third field related to a frame type to be used for the UL MU transmission.

3. The method of claim 1, wherein a first type resource allocated by the first type resource information is non-exclusively allocated to the STA and a second type resource allocated by the second type resource information is exclusively allocated to the STA.

4. A station (STA) in a wireless local area network (WLAN), the STA comprising:
a transceiver; and
a processor,
wherein the processor is configured to:
perform, with an access point (AP) via the transceiver, an association procedure to obtain an association identifier (AID) for the STA;
receive, from the AP via the transceiver, a beacon frame comprising a first field related to a transmission time of a trigger frame including frequency resource information to be used for an uplink multi-user (UL MU) transmission, wherein the frequency resource information to be included in the trigger frame includes at least one of a first type resource information used for random access based on orthogonal frequency division multiple access (OFDMA) and a second type resource information scheduled for at least one receiving STA, wherein the beacon frame further comprises a second field related to whether or not the trigger frame includes the first type resource information, wherein the second field includes a first value when the trigger frame includes the first type resource information and the second type resource information, and wherein the second field includes a second value when the trigger frame does not include the first type resource information;
receive, from the AP via the transceiver, the trigger frame based on the first field;
determine an UL resource to be used for the UL MU transmission from the first type resource information and the second type resource information included in the trigger frame when the second field has the first value; and
perform, via the transceiver, the UL MU transmission based on the determination.

5. The STA of claim 4, wherein the beacon frame further comprises a third field related to a frame type to be used for the UL MU transmission.

6. The STA of claim 4, wherein a first type resource allocated by the first type resource information is non-exclusively allocated to the STA and a second type resource allocated by the second type resource information is exclusively allocated to the STA.

* * * * *